(12) United States Patent
Ota et al.

(10) Patent No.: US 7,853,872 B2
(45) Date of Patent: Dec. 14, 2010

(54) LAYING OUT FIELD REGIONS IN A PAGE FOR INSERTION OF DATA

(75) Inventors: Satoshi Ota, Yokohama (JP); Hajime Ohno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/276,037

(22) Filed: Feb. 10, 2006

(65) Prior Publication Data
US 2006/0184876 A1 Aug. 17, 2006

(30) Foreign Application Priority Data
Feb. 14, 2005 (JP) ............................. 2005-036952

(51) Int. Cl.
*G06F 17/00* (2006.01)
(52) U.S. Cl. .................... 715/243; 715/209; 715/234
(58) Field of Classification Search .......... 715/243–253
See application file for complete search history.

(56) References Cited

U.S. PATENT DOCUMENTS

| | | | | |
|---|---|---|---|---|
| 5,845,303 A | * | 12/1998 | Templeman | ................. 715/255 |
| 6,161,114 A | * | 12/2000 | King et al. | ................... 715/202 |
| 6,596,032 B2 | * | 7/2003 | Nojima et al. | ............... 715/247 |
| 6,826,727 B1 | * | 11/2004 | Mohr et al. | ................... 715/235 |
| 7,039,863 B1 | * | 5/2006 | Caro et al. | ................... 715/209 |
| 7,325,196 B1 | * | 1/2008 | Covington et al. | ........... 715/251 |
| 7,325,197 B1 | * | 1/2008 | Massena et al. | .............. 715/251 |
| 7,380,202 B1 | * | 5/2008 | Lindhorst et al. | ............ 715/204 |
| 7,454,699 B2 | * | 11/2008 | Altman et al. | ............... 715/255 |
| 7,469,378 B2 | * | 12/2008 | Nagahara et al. | ............. 715/243 |
| 7,532,355 B2 | * | 5/2009 | Gauthier et al. | ............ 358/1.18 |
| 7,555,710 B2 | * | 6/2009 | Kobashi et al. | .............. 715/243 |
| 7,656,543 B2 | * | 2/2010 | Atkins | ........................ 358/1.13 |
| 2002/0149792 A1 | * | 10/2002 | Gauthier et al. | ............. 358/1.18 |
| 2007/0055925 A1 | * | 3/2007 | Giannetti | ..................... 715/511 |

FOREIGN PATENT DOCUMENTS

JP 2000-048216 A1 2/2000
JP 2000-222493 A1 8/2000

* cited by examiner

*Primary Examiner*—Doug Hutton
*Assistant Examiner*—Benjamin J Smith
(74) *Attorney, Agent, or Firm*—Fitzpatrick, Cella, Harper & Scinto

(57) ABSTRACT

A partial layout area using a template is created in a page. Setting information on the template used in the created partial layout area is set. The layout of the template used in the created partial layout area is controlled on the basis of the setting information set for the partial layout area.

9 Claims, 22 Drawing Sheets

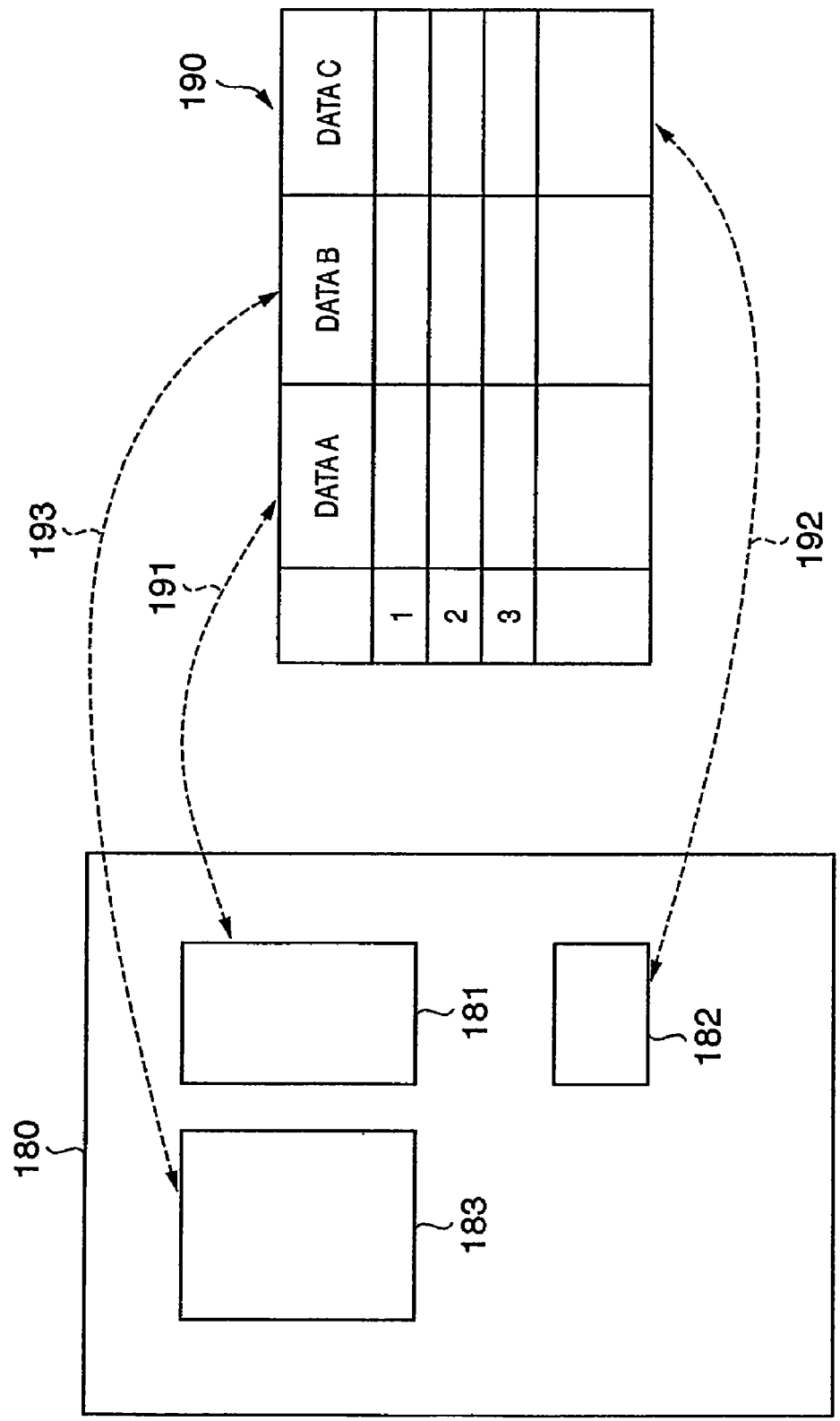

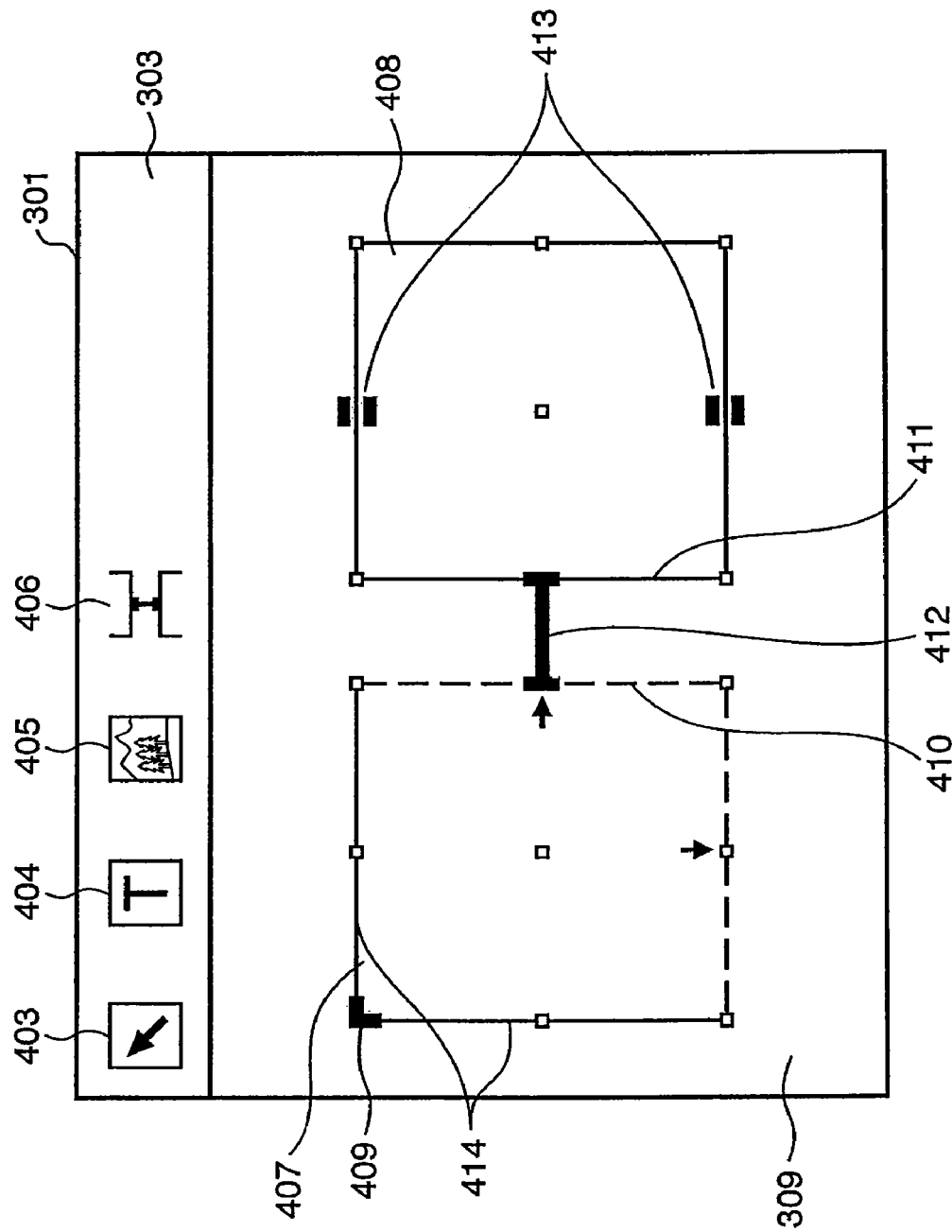

LAYING OUT FIELD REGIONS IN A PAGE FOR INSERTION OF DATA

FIELD OF THE INVENTION

The present invention relates to an information processing apparatus which lays out, in a page, field regions for inserting data of data fields that are selected from a record containing a plurality of types of data fields, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise customer satisfaction, win new customers, and keep existing customers.

One-to-one marketing is a kind of database marketing which creates a database of individual attribute information including the age, gender, hobbies, preferences, and purchase log of a customer, analyzes the contents of the database, and makes a proposal complying with the customer's needs. A typical method of this marketing is variable printing. These days, a variable printing system which customizes a document for each customer and outputs the document has been developed along with the development of DTP (Desk Top Publishing) techniques and the proliferation of digital printing apparatuses. The variable printing system needs to create a customized document in which contents different for respective customers are laid out.

Generally, when such a customized document is to be created by the variable printing system, containers are laid out in a document. The container is a drawing region for drawing contents (e.g., an image and text), and is also called a field region.

A desired customized document (called a document template) can be created by laying out containers in a document and associating a database with the layout (associating various contents in the database with the containers). The contents of the customized document can be changed (made variable) by properly switching contents in the containers in the customized document for each record in the database. Such a document is called a variable data document, and a print system using the variable data document is a variable printing system. As a method of creating a variable printing template, a form creation application has conventionally been proposed (e.g., Japanese Patent Laid-Open No. 2000-222493).

In a conventional variable printing system, the size of a container associated with a text or image serving as contents is fixed. When contents in the database are inserted (flowed) into a container and the data amount is larger than the container size, the following problems arise. If the data is text, overlapping of the text occurs. If the data is an image, clipping of the image by the container occurs, and part of the image is lost. When the data amount is smaller than the container size, no proper display may be obtained as a gap appears between the perimeter of the container and its internal contents.

There is also known a technique of, when a text to be inserted into a container of a fixed container size cannot be fully fitted in the container, changing (in this case, reducing) the font size of the text to display all the text in the container. However, if a container enlarges in accordance with contents to be inserted in an environment where the container size is flexible, the container overlaps another container in the same document. If the data amount of text to be inserted is excessively large in an environment where the font size is flexible, the font size is reduced excessively.

As another automatic layout technique which solves these problems, a "Layout Designing Apparatus" is disclosed in Japanese Patent Laid-Open No. 2000-48216. In this reference, when the data amount to be inserted into a given container (image component block) becomes large, the layout position of the next container (image component block) to be laid out is changed. If data cannot be fully inserted in a container, it is moved to the next container (image component block) to be laid out.

In the conventional variable printing system, a multi-record technique of laying out multiple records in one document is also known in addition to a technique of laying out one record in one document. The multi-record technique makes it possible to change the number of laid-out data for one customer, and to create a document customized for each customer.

In, however, the variable printing system disclosed in Japanese Patent Laid-Open No. 2000-48216, the layout order is determined in advance as an order of data to be flowed. The layout is decided by laying out data one by one in accordance with the layout order. If the data amount to be flowed is large (the data size of each data is large), data of a low layout order is assigned with a small layout region and may not be laid out.

In order to solve this problem, a dynamic layout system has been devised. The dynamic layout system flexibly sets the container size of a container laid out in a document, and links (associates) flexibly set containers to each other. With this setting, the linked containers push each other and make their loads equal, deciding the container positions and sizes. Software which implements the dynamic layout system can change the size of each container in accordance with the relationship between each container and the data amount inserted into the container.

In the dynamic layout system, it is devised to provide a function of defining layouts (product name, image, specifications, and the like) for one product as an organized template (to be referred to as a subtemplate hereinafter) in advance, like creating a layout for a product brochure or the like.

However, in the dynamic layout system for the variable printing system, only one partial layout area is devised for one template. That is, no single record can be divided and laid out in a plurality of partial layout areas on the same page. It is difficult to implement a division layout in which one record is divided into a set of product images and a set of specification tables.

When a plurality of partial layout areas are set on the same page, contents are sequentially laid out in containers defined in the respective partial layout areas. On the same page, contents of three records may be laid out in the first partial layout area, whereas contents of four records may be laid out in the second partial layout area. If contents of a set of product images and those of a set of specification tables are laid out in separate partial layout areas, the contents of the product images and those of the specification tables may be misaligned with each other.

SUMMARY OF THE INVENTION

The present invention has been made to overcome the conventional drawbacks, and has as its object to provide an information processing apparatus capable of preferably laying out a plurality of types of templates on the same page, a control method therefor, and a program.

Also, the present invention has been made to overcome the conventional drawbacks, and has as its object to provide an information processing apparatus capable of deciding a layout while associating contents laid out by templates (partial layout areas) with each other, a control method therefor, and a program.

According to the present invention, the foregoing object is attained by providing an information processing apparatus which lays out, in a page on the basis of a template, field regions for inserting data of data fields selected from a record containing a plurality of types of data fields, comprising:

creation means for creating a partial layout area using the template in the page;

setting means for setting setting information on the template used in the partial layout area created by the creation means; and control means for controlling, on the basis of the setting information set for the partial layout area, a layout of the template used in the partial layout area created by the creation means.

In a preferred embodiment, the setting means sets setting information on a layout direction and layout interval of a layout used in the partial layout area, and sync setting with another partial layout area.

In a preferred embodiment, the sync setting is setting for synchronizing the numbers of templates for use between partial layout areas.

In a preferred embodiment, when the sync setting is made between partial layout areas, the control means controls the numbers of templates used in the respective partial layout areas so as to restrict the numbers of templates used in the respective partial layout areas to the smallest maximum number of templates among the maximum numbers of templates available in the respective partial layout areas.

In a preferred embodiment, when one of templates used in respective partial layout areas cannot be laid out in a corresponding partial layout area and the sync setting is made between the partial layout areas, the control means creates a new page, and creates, in the new page, a partial layout area for laying out the template which cannot be laid out in the page.

In a preferred embodiment, when one of templates used in respective partial layout areas cannot be laid out in a corresponding partial layout area and no sync setting is made between the partial layout areas, the control means outputs a predetermined message.

According to the present invention, the foregoing object is attained by providing a method of controlling an information processing apparatus which lays out, in a page on the basis of a template, field regions for inserting data of data fields selected from a record containing a plurality of types of data fields, comprising:

a creation step of creating a partial layout area using the template in the page;

a setting step of setting setting information on the template used in the partial layout area created in the creation step; and a control step of controlling, on the basis of the setting information set for the partial layout area, a layout of the template used in the partial layout area created in the creation step.

According to the present invention, the foregoing object is attained by providing a program which is stored in a computer-readable storage medium and implements control of an information processing apparatus that lays out, in a page on the basis of a template, field regions for inserting data of data fields selected from a record containing a plurality of types of data fields, comprising:

a program code for a creation step of creating a partial layout area using the template in the page;

a program code for a setting step of setting setting information on the template used in the partial layout area created in the creation step; and a program code for a control step of controlling, on the basis of the setting information set for the partial layout area, a layout of the template used in the partial layout area created in the creation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining an outline of variable data printing according to the embodiment of the present invention;

FIG. 4A is a view showing an example of display of a container in the user interface according to the embodiment of the present invention;

DETAILED DESCRIPTION OF THE PREFERRED EMBODIMENT

A preferred embodiment of the present invention will be described in detail in accordance with the accompanying drawings.

<System Configuration>

The hardware configuration of an information processing system and that of a host computer as a building component of the information processing system according to an embodiment will be described with reference to FIGS. 1A and 1B.

Figure 1A:
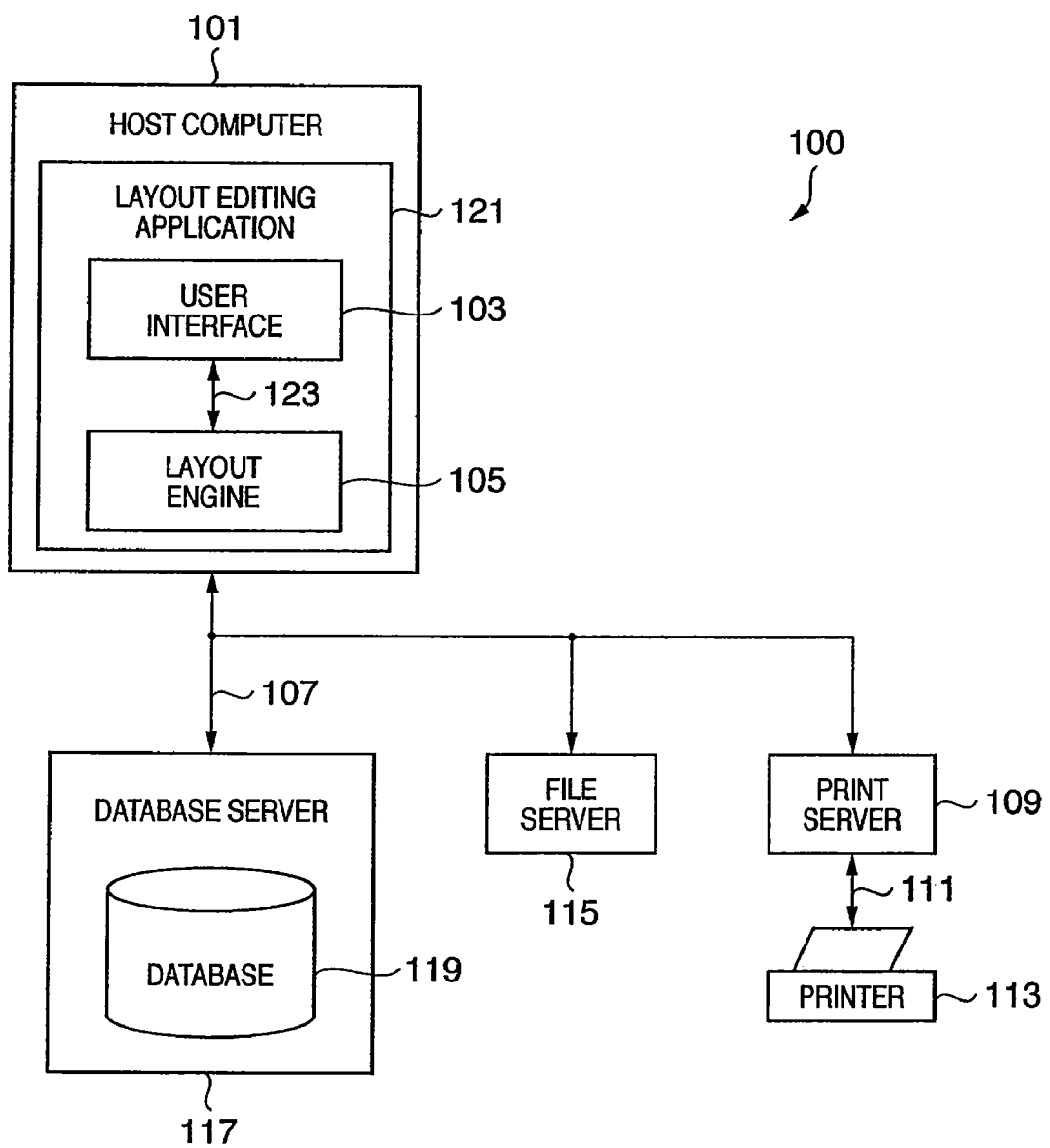
FIG. 1A is a block diagram showing an example of the configuration of an information processing system according to an embodiment of the present invention.

FIG. 1A is a block diagram showing an example of the configuration of the information processing system according to the embodiment of the present invention. FIG. 1B is a block diagram showing the hardware configuration of the host computer (corresponding to an information processing apparatus according to the present invention) as a building component of the information processing system according to the embodiment of the present invention.

Figure 1B:
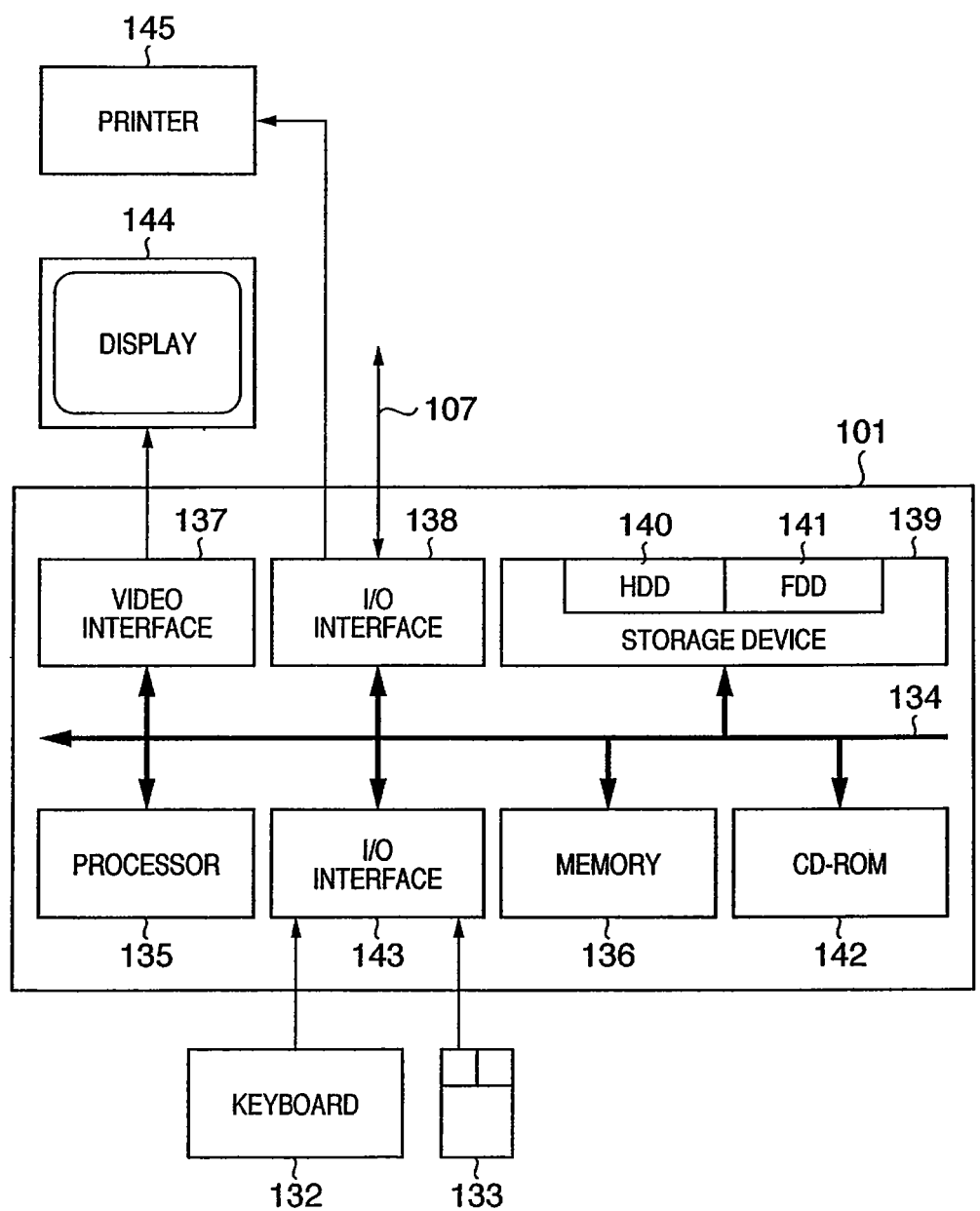
FIG. 1B is a block diagram showing the hardware configuration of a host computer as a building component of the information processing system according to the embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the embodiment is implemented by the host computer 101 (formed from a general-purpose computer module) which functions as a layout editing apparatus.

The layout editing apparatus can execute a dynamic layout process. In this process, the position and size of each container are dynamically decided under constraints on the amount and size of contents and association between containers in variable output (printing or preview display), which will be described later.

A layout editing application 121 which can run in the variable printing system 100 is executed completely or partially by the host computer 101. In particular, a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a Floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

In the embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or Floppy® disk. This program is loaded into the host computer 101 via the corresponding CD-ROM drive 142 or Floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, a magneto-optical disk, radio communication (e.g., infrared communication) between the host computer 101 and another device, a computer-readable card (e.g., a PCMCIA card), or another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)), and includes two software components: a layout engine 105 and user interface 103.

The layout engine 105 is a software component for loading records one by one from variable data which are stored as records in the database 119, under constraints on size and position given to a container (rectangular range) serving as a field region (partial region), and calculating, from the loaded variable data and the container constraints, the layout including the size and position of a container to which the loaded variable data is flowed.

In the embodiment, the layout engine 105 also performs a process of drawing variable data assigned to a container and generating an image of a variable data document. However, the present invention is not limited to this, and the layout engine 105 operates as an application which decides the size and position of each partial region (container) and outputs drawing information to a printer driver (not shown). The printer driver may perform a variable data document image drawing process and generate print data.

The user interface 103 allows the user to set the layout and attribute of a container and create a document template (also called template information). The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data. The variable data document is directly printed by the printer 113 via the local file system of the host computer 101, the file server 115, or the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
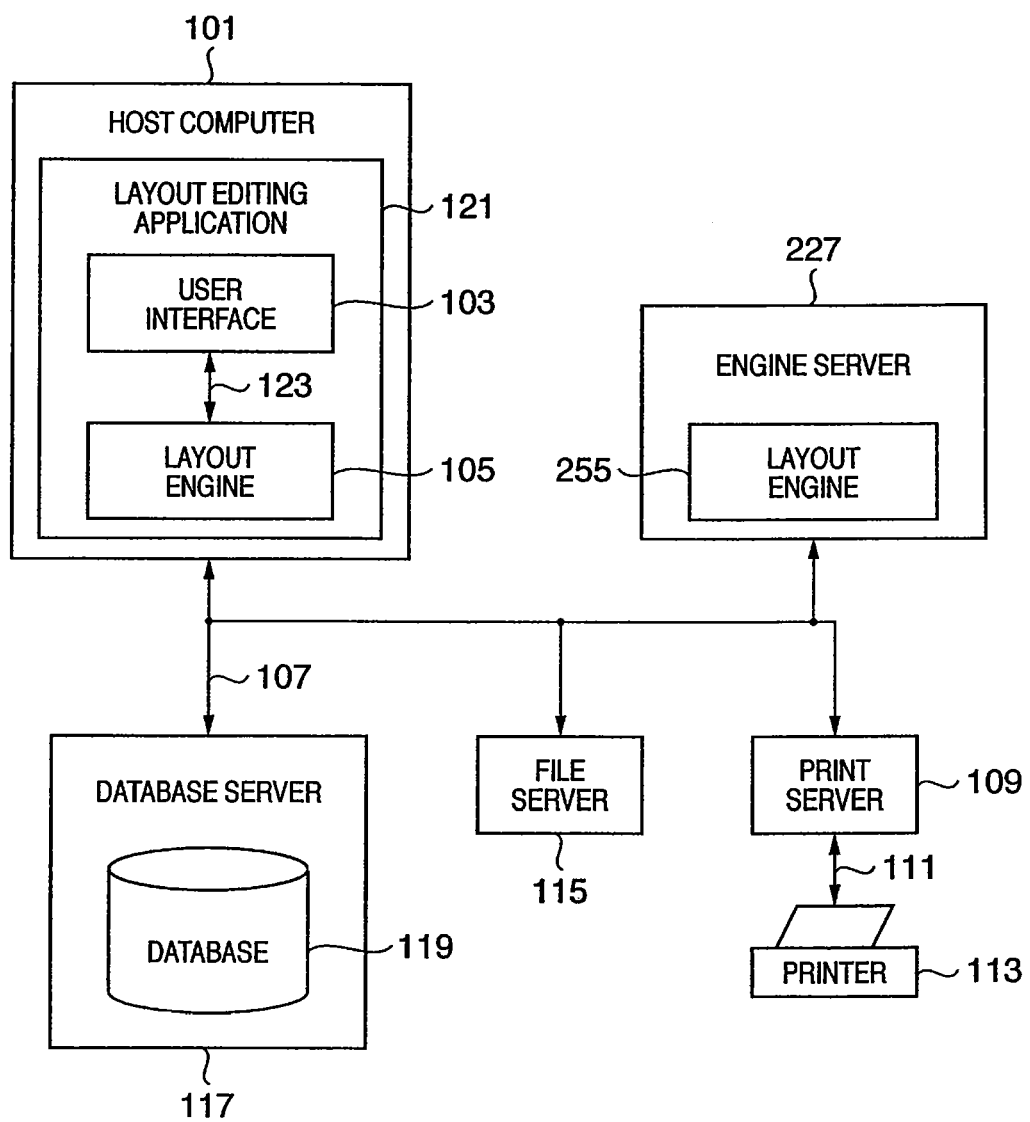
FIG. 1C is a block diagram showing another example of the configuration of the information processing system according to the embodiment of the present invention.

FIG. 1C is a block diagram showing another configuration of the information processing system according to the embodiment of the present invention.

FIG. 1C illustrates an example in which an engine server 227 is added to the network 107 and a layout engine 225 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be connected to data saved in the database 119 in order to generate a document by the layout engine 225 for printing or another purpose. Such operation is requested via the user interface 103 or so requested as to print only a specific record.

<Outline of Layout Editing Application>

An outline of variable data printing will be explained with reference to FIG. 2.

FIG. 2 is a view for explaining an outline of variable data printing according to the embodiment of the present invention.

A plurality of containers 181 to 183 are laid out on a page in accordance with an operation instruction from the user via the user interface 103 of the layout editing application 121, and constraints on position and size are assigned to the containers to generate a document template 180.

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed content data.

For a preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3.

[Main Window]

Figure 3:
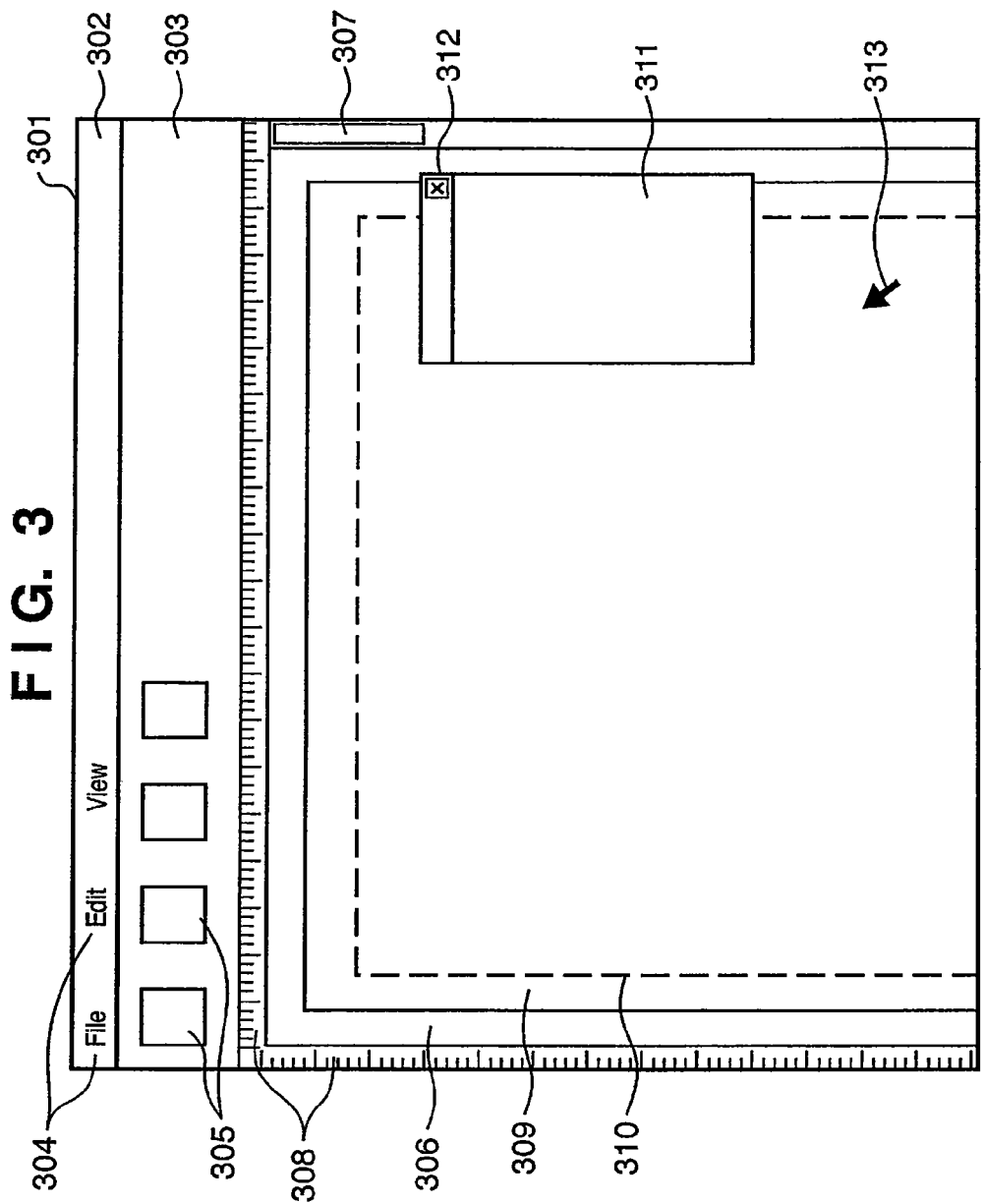
FIG. 3 is a view showing an example of a user interface according to the embodiment of the present invention.

FIG. 3 is a view showing an example of the user interface according to the embodiment of the present invention.

As shown in FIG. 3, the user interface 103 displays on the display device 144 a user interface which is formed by an application window 301 upon operation. The application window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/ hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

The tool bar 303 has a plurality of types of "buttons" 403 to 406 which can be selected by the user, as shown in FIG. 4A.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can decide a basic layout by laying out containers and links in a page. The basic layout is a base for variable data printing. When each container in the basic layout is a fixed layout, the print results of all records have the same layout.

When each container in the basic layout is a flexible container (to be described later), the size and position of the container change in accordance with the amount and size of data loaded from each record under constraints (to be described later). Hence, a document template created by the layout editing application 121 decides only the basic layout. When the document template contains a flexible container, the layout of a finally printed material is adjusted in accordance with loaded data.

[Document Template]

In FIG. 3, the work area 306 is used to display and edit the design of the document template (180: basic layout). The work area 306 can present a basic outline of a document to be printed to the user while the user designs an outline of a document template. A document template to be created has a layout desired by the user. A calculated layout changes between records because the variable printing system dynamically decides the layout in accordance with the amount and size of content data.

From a comparison between the document template and the preview after dynamic layout calculation, the user can understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on variable data in an associated data source. This is because an additional page is automatically created upon loading variable data which cannot be fitted in one page when a field that changes in size depending on the variable data amount, like a flexible table, is set in the document template.

A boundary 310 displayed in each page is an arbitrary page margin which represents the maximum width of a printable object on the page.

FIG. 4A shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4A, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container.

The link 412 represents that the containers 407 and 408 are associated, though details of the link 412 will be described later. The link 412 also represents that the container 408 can be moved to the right while maintaining a length (range can be specified) set for the link 412. The slider 413 shows that it can be moved parallel to an edge at which the slider 413 is set.

[Container]

A container serving as a field region for inserting data of a plurality of types of data fields contained in each record in the database will be explained.

The container is a field region (to be referred to as a partial region) where a fixed or flexible text and image (data in a plurality of types of data fields) are flowed from a variable data file into a document template and drawn. The container is laid out together with other containers and objects, as shown in FIG. 4A. The container is moved, adjusted in size, or created again by operation of the mouse 133 in accordance with an operation instruction from the user via the user interface.

More precisely, the container has container attributes representing the position, the maximum, minimum, design sizes, the maximum and minimum font sizes of contents to be merged, and whether each edge is fixed/flexible. All the definitions of the container attributes in the embodiment will be described.

(1) A container has fixed or flexible contents. Flexible contents (variable data) are dynamic in the sense that data acquired from the data source may change for each document, i.e., each record. Note that flexible contents in the embodiment are not intended to be animated contents or contents which change over time by another method because these contents are not suitable for printing.

Similarly, fixed contents are displayed in the same way for all documents generated using containers. When, however, a link to flexible contents is set, fixed contents may change in position in each document under the influence of the flexible contents. Contents to be merged with containers change between records, and the display contents also change.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4A. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite count representing container operation when a container is merged with data from the data source, a line, an icon, and a text.

[Container Constraints]

The container has constrains on controlling how to link contents displayed in each document. These constraints (including linking of fixed/flexible contents to a container) are a major method of controlling generation of many documents from one document template by the user.

An example of the constraints is "the height of contents in this container is 4 inches at maximum." Another example of the constraints is "the left edge of contents in the container must be displayed at the same horizontal position in respective documents." The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in a region in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, the term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When a corner position of a container, an intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial region). The user can create a desired basic layout when he decides the basic layout of the document template 180.

[Display and Editing of Container]

——Method of Creating New Container——

A container is described as either of two, text and image containers. The text container has a text and buried image. The image container has only an image.

As shown in FIG. 4A, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container), a handle 502 (control point drawn on or near the edge of a region for movement and modification), the slider 413 (short parallel lines drawn on the two sides of an edge: see FIG. 4A), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted in drawing lines.

The place at which a flexible edge is drawn depends on the contents of a container. As will be described later, a "dynamic calibration process" is employed which means that contents are merged into a document template and visualized on a user interface. Alternative execution can be achieved by another means for deciding where a flexible edge is laid out in a user interface or in the content region of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4A.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4A is an example of the anchor icon meaning that the position where the edges 414 cross each other is fixed.

(4) A slider means that the length of an associated edge is fixed but may be translated. For example, the slider 413 in FIG. 4A represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Figure 4B:
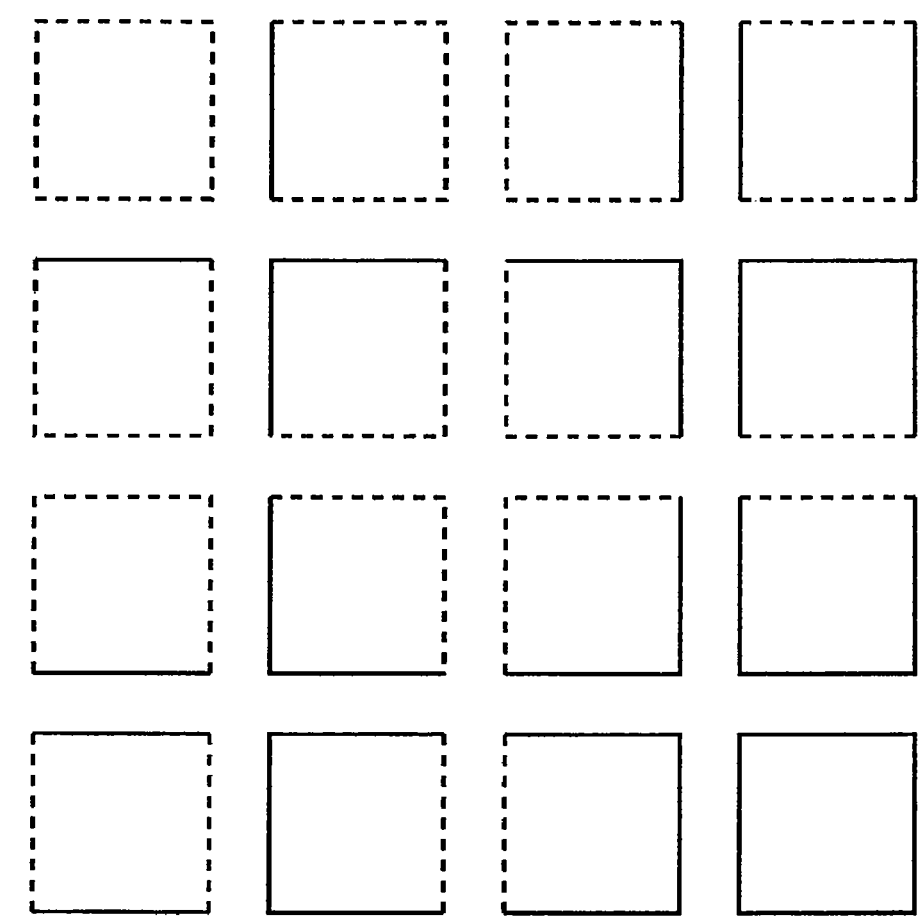
FIG. 4B is a view showing state types of container edges according to the embodiment of the present invention.

Some or all of these icons and edges are drawn or are not drawn depending on which of tools and containers is selected, highlighted, or made active. FIG. 4B shows 16 states of container edges on the basis of the above rules. Generally, the edges and icons of a container only assist designing a document template, and are not drawn on a printed material.

As described above, settings of a basic pattern such as the default, minimum, and maximum values of the width and height of a container are displayed in a secondary dialog window.

Figure 5A:
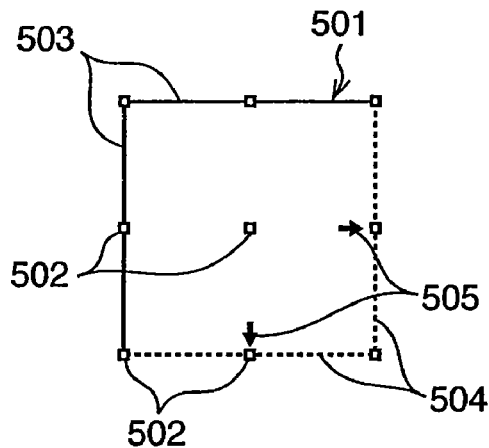
FIGS. 5A to 5D are views for explaining container display rules according to the embodiment of the present invention.

In FIG. 5A, both the width and height of a container 501 are not fixed (are flexible). A fixed edge 503 is represented in a solid line, and a flexible edge 504 is represented in a dotted line. A scaling icon 505 exhibits that the adjacent edge 504 is flexible. An indicator in another form may be used instead or additionally.

Figure 5B:
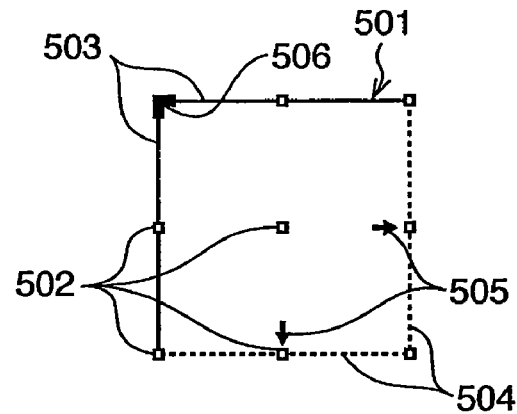

In FIG. 5B, both the width and height of the container 501 are flexible. An anchor icon 506 is so added as to explicitly represent that the corner position between two crossing edges 503 is fixed.

Figure 5C:
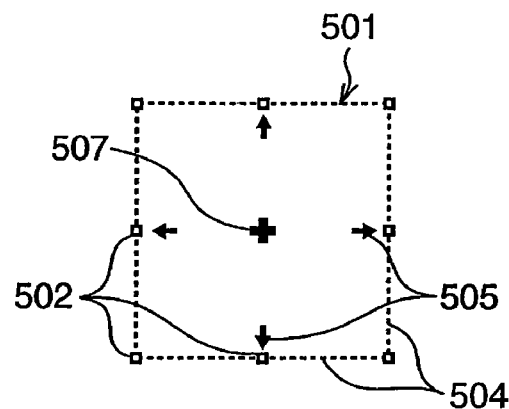

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

Figure 5D:
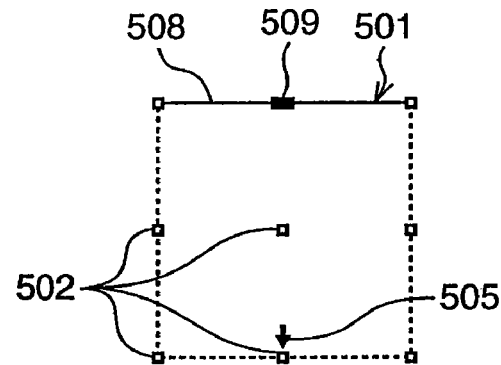

In FIG. 5D, an upper edge 508 of the container 501 is fixed, but both the width and height are flexible. The anchor icon 509 positioned at the center of the upper edge 508 is fixed. The left and right edges (502) of the container 501 move apart from or close to the vertical center axis (vertical axis) which extends through the anchor icon 509.

[Link]

A link indicates association between containers. The association represents a distance between containers, and containers associated by a link execute layout calculation upon a change in their layouts. For example, the link 412 in FIG. 4A associates the containers 407 and 408 with each other, as described above. The link setting method and the layout calculation method for containers associated by a link will be described later.

[Link Setting Method]

Setting of a link for associating containers will be explained.

Figure 6:
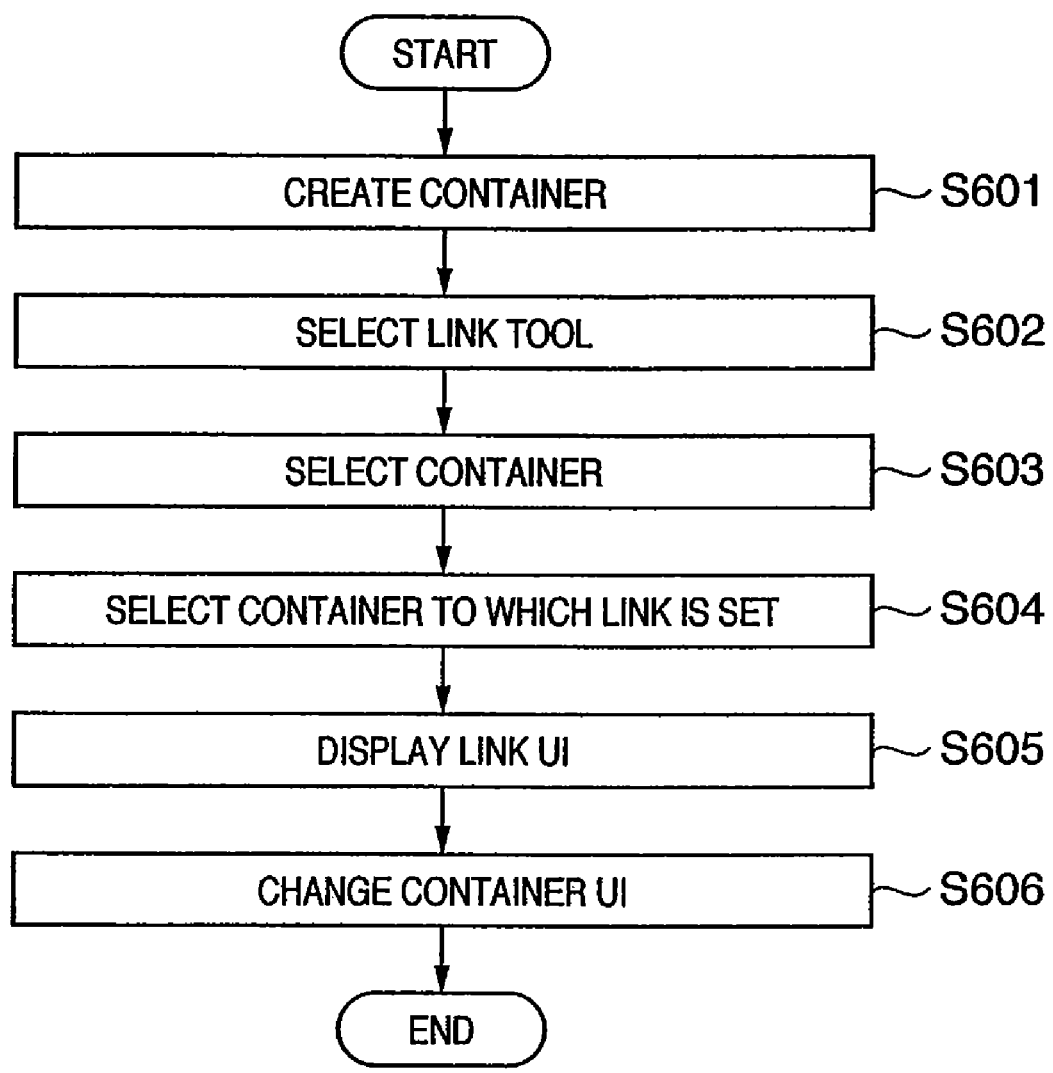
FIG. 6 is a flowchart showing a link setting process according to the embodiment of the present invention.
Figure 7A:
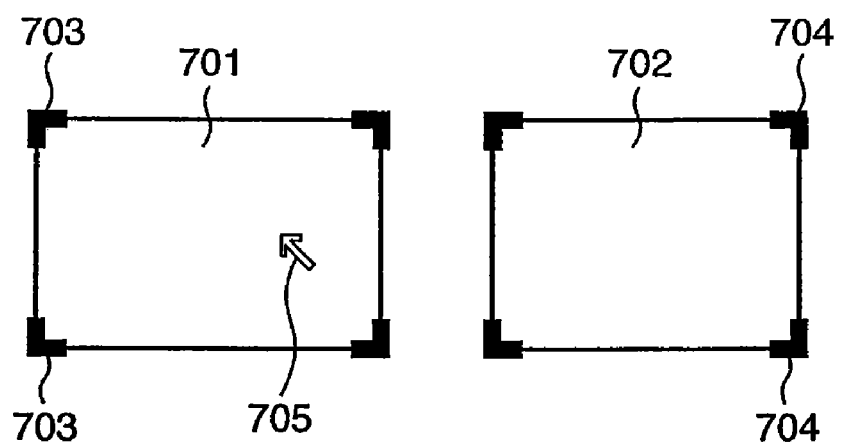
FIGS. 7A to 7C are views showing an example of transition of the user interface in setting a link according to the embodiment of the present invention.
Figure 7B:
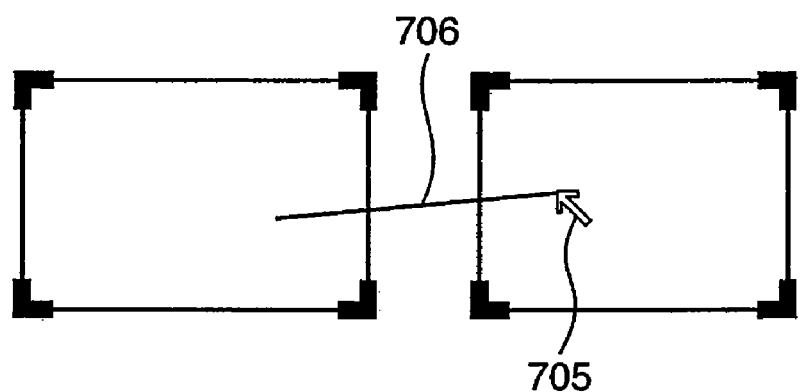
Figure 7C:
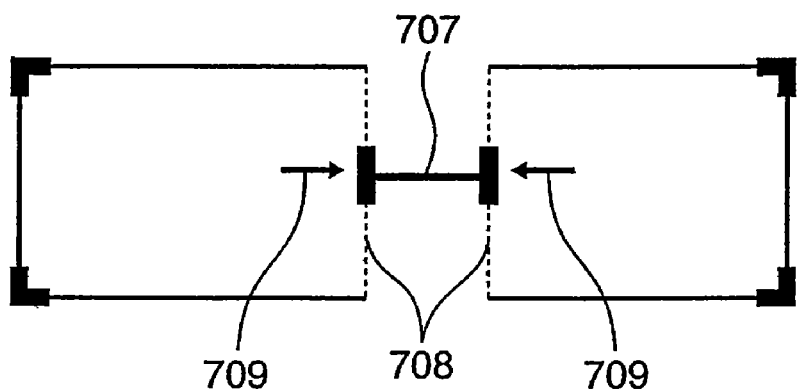

FIG. 6 is a flowchart showing a link setting process according to the embodiment of the present invention. FIGS. 7A to 7C are views showing an example of transition of a user interface in setting a link according to the embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4A).

In FIG. 7A, containers 701 and 702 are made up of fixed edges. Reference numerals 703 and 704 denote anchors, similar to 409 in FIG. 4A. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7B exhibits a line which connects a click position in the state of FIG. 7A and the current position of the mouse pointer 705. A UI indicated by the line segment 706 can present the user with a position where a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4A.

<Layout Calculation Process by Layout Engine>

[Layout Calculation Method (Overall Flow)]

The layout editing application 121 according to the embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
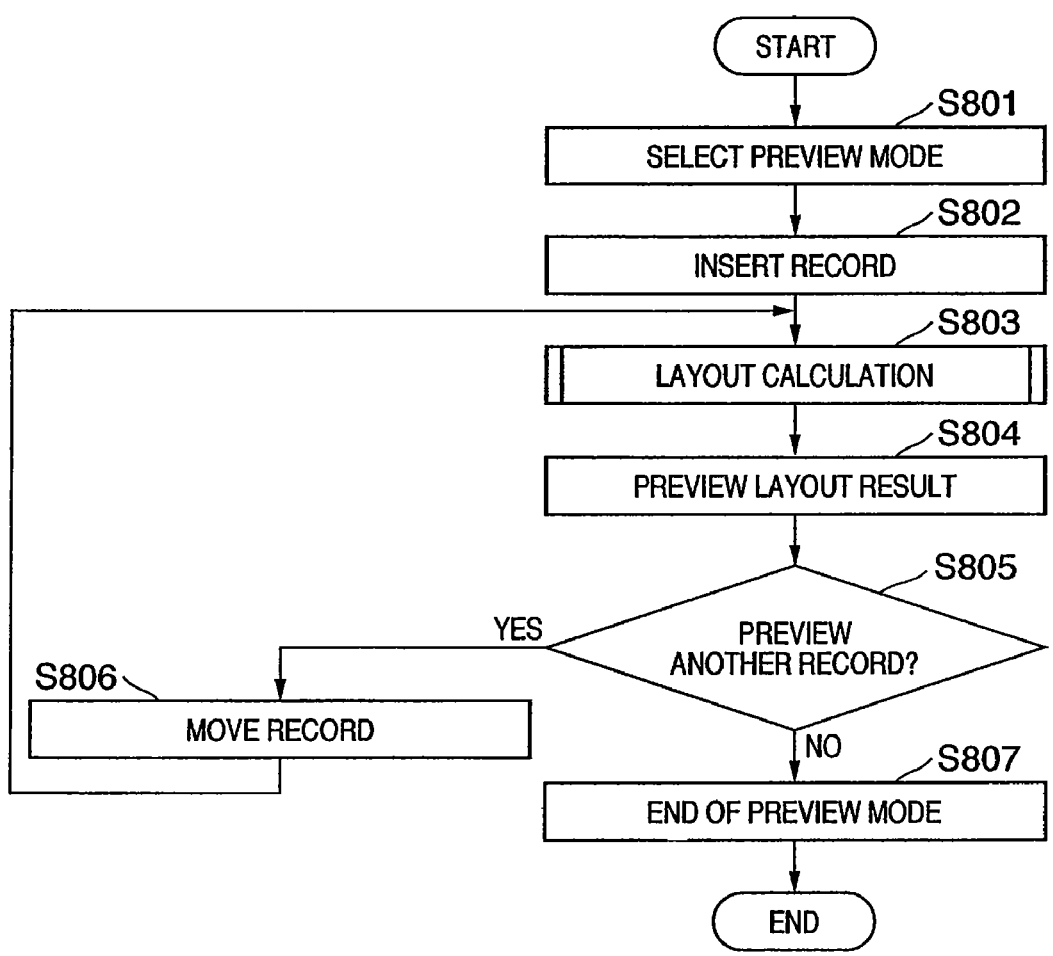
FIG. 8 is a flowchart showing a layout calculation process according to the embodiment of the present invention.

FIG. 8 is a flowchart showing the layout calculation process in the layout editing application 121 according to the embodiment of the present invention.

This control flow explains a method of flowing (merging) the contents of each record from the database 119 into a document template, and dynamically calculating the layout in accordance with the container attributes and the amount and size of each content. This flowchart describes control executed by the layout engine 105 of the layout editing application 121 using the processor 135 and memory 136.

When the preview mode is selected, the layout editing application 121 starts the process (step S801).

The above-described control in FIG. 6 is an operation in a layout mode in which an automatic layout system creates at least two containers and associates them to each other to create the layout of a document template.

To the contrary, the control in FIG. 8 starts by executing the preview mode in which a record is inserted into the layout created in FIG. 6 and a layout result after actually inserting the record is previewed. In step S801, the preview mode is selected, and an actual record is inserted to calculate the layout. In the preview mode, a layout for display is calculated. Also in actual printing, a record is inserted to calculate the layout. A calculation method in printing is also the same as that in the preview mode.

After the preview mode is set, the layout editing application 121 selects a record to be previewed, and inserts each field data of the selected record into each container (step S802). When the user designates a specific record, the designated record is previewed. If the user does not designate any record, calculation starts sequentially from the first record.

After each field data is inserted into a corresponding container, the layout editing application 121 performs layout calculation for laying out the record (step S803). Details of layout calculation in step S803 will be described with reference to FIG. 9.

The layout editing application 121 displays (previews) the layout calculated in the process of step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In the printing mode, unlike the preview mode, layout calculation is performed by the same procedure as the above-described one sequentially for all records to be printed. Hence, step S804 is omitted, and whether all records to be printed have been processed is determined in step S805. In step S807, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
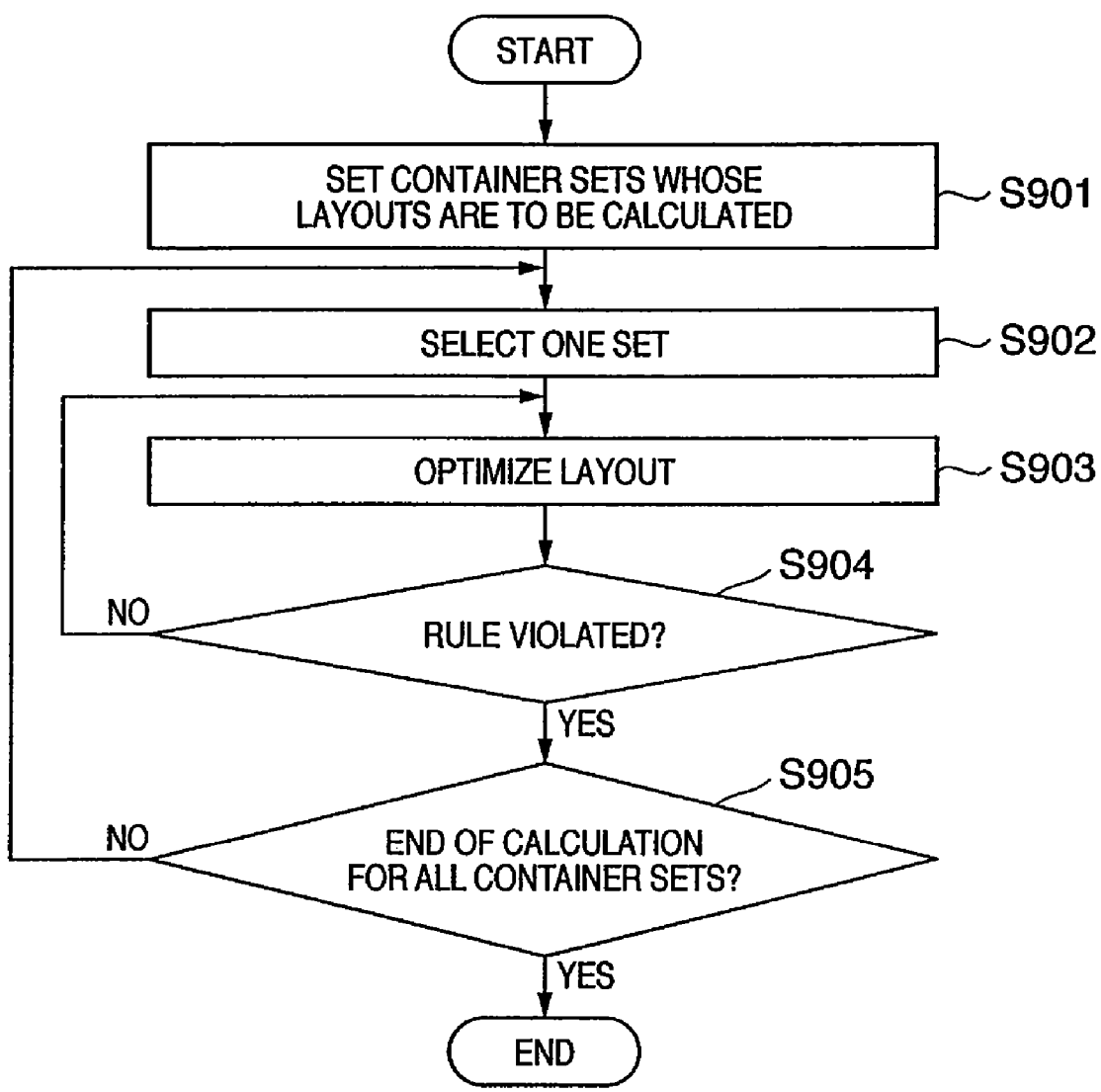
FIG. 9 is a flowchart showing details of the layout calculation process according to the embodiment of the present invention.

FIG. 9 is a flowchart showing details of the layout calculation process according to the embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets container sets whose layouts are to be calculated (step S901). Layout calculation is done for associated containers as one set.

Figure 10:
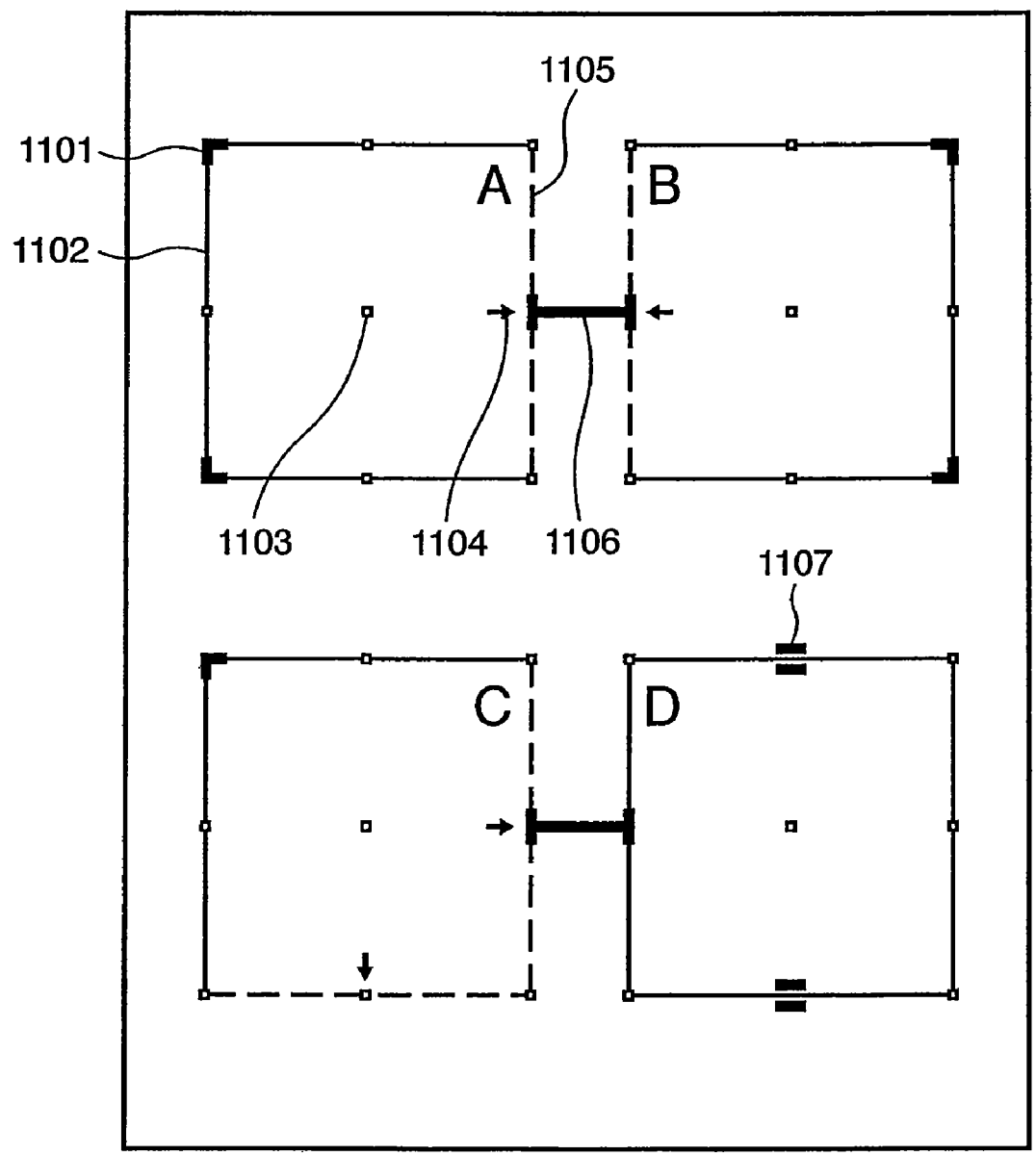
FIG. 10 is a view for explaining a set of containers in the layout calculation process according to the embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and the link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout violates the rules (step S904). If the layout does not violate rules (YES in step S904), the process advances to step S905. If the layout violates the rules (NO in step S904), the process returns to step S903 to calculate the layout again so as not to violate the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to violate the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 11C.

Figure 11A:
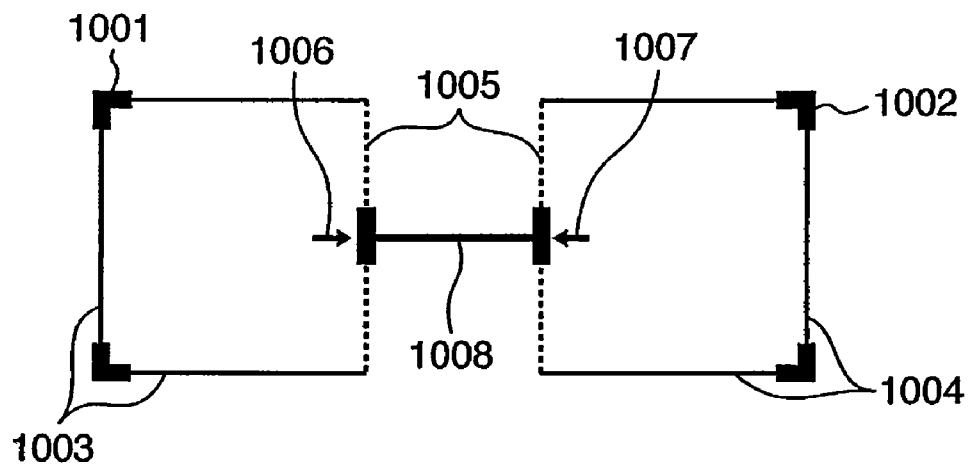
FIGS. 11A to 11C are views showing an example of the user interface in the layout calculation process according to the embodiment of the present invention.
Figure 11B:
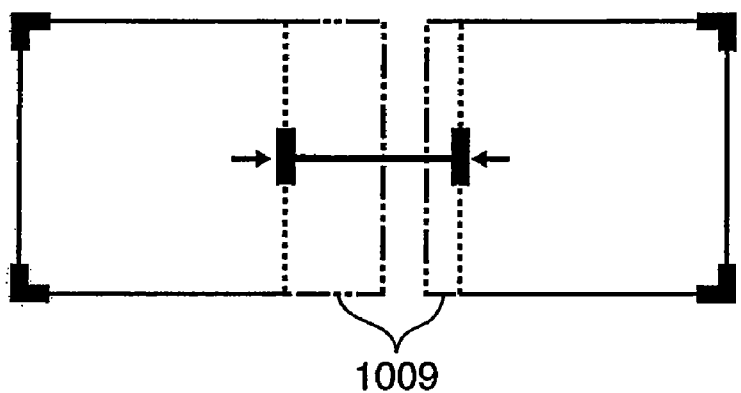
Figure 11C:
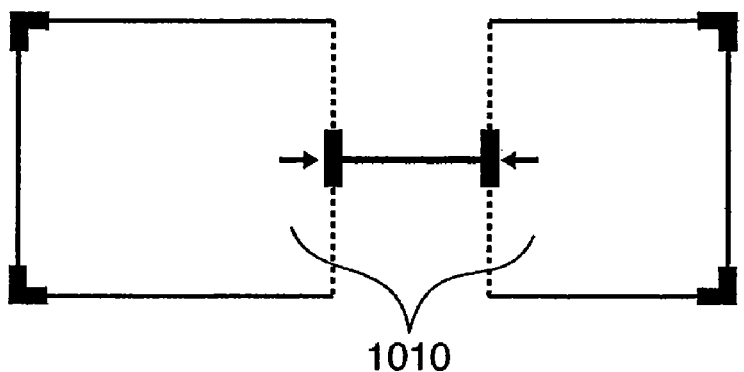

FIGS. 11A to 11C are views showing an example of a user interface in the layout calculation process according to the embodiment of the present invention.

FIG. 11A shows a state in which a given record is inserted and the layout is decided. Reference numerals 1001 and 1002 denote anchors; 1003 and 1004, fixed edges; 1005, a flexible edge; 1006, an arrow indicating a direction in which a flexible edge changes; and 1108, a link. In this state, a record is changed, and contents of different sizes are inserted.

FIG. 11B shows the size of new contents over the state of FIG. 11A. Reference numeral 1009 denotes the size of contents which are inserted into each container. After that, the layout is calculated.

FIG. 11C shows the result of layout calculation. The size of each container after calculation is so calculated as to have a difference equal to that of the size of contents to be actually inserted, and not to violate the above-mentioned rules. As shown in FIG. 11C, the inserted-content size 1009 shown in FIG. 11B and a calculated content size 1010 have the same difference.

[Multiple Records]

An outline of multiple records will be explained.

Figure 12:
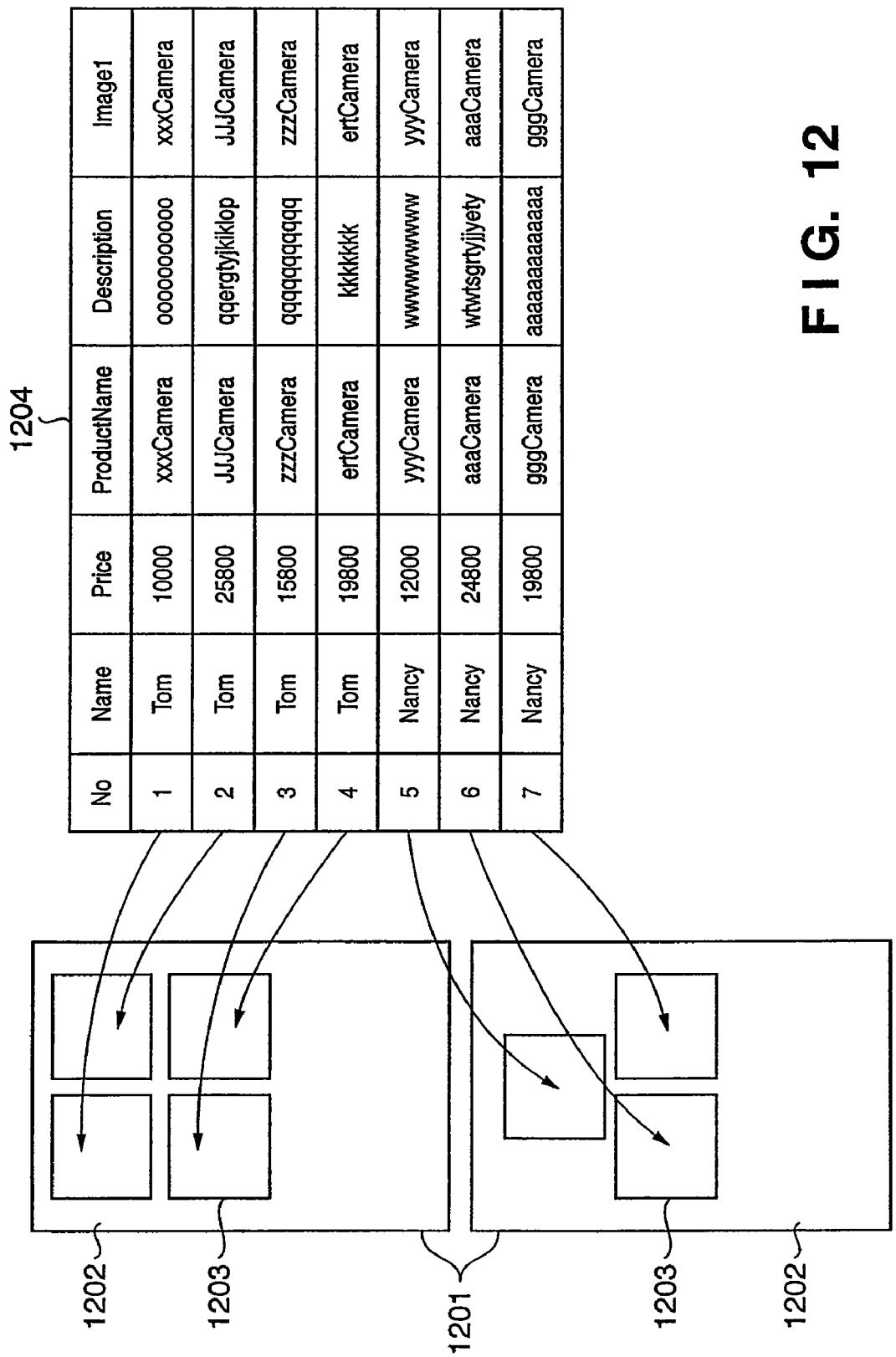
FIG. 12 is a view showing an outline of multiple records and a layout method for them according to the embodiment of the present invention.

FIG. 12 is a view showing an outline of multiple records and a layout method for them according to the embodiment of the present invention.

Reference numeral 1201 denotes a document; 1202, a page; 1203, a subtemplate; and 1204, a database. The database 1204 manages records Nos. 1 to 7. In variable printing in which one record corresponds to one document, seven documents are created because there are seven records.

In variable printing which supports multiple records for one document, the following process is executed.

The user arbitrarily designates a column whose multiple records are designated. In this example, a field name "Name" is designated. In this case, records having the same field name are laid out in one document. In this example, the "Name"s of records Nos. 1 to 4 are "Tom", and these record data are laid out in the same document. Also, the "Name"s of records Nos. 5 to 7 are "Nancy", and these record data are laid out in the same document.

More specifically, when a plurality of subtemplates 1203 are flowed into flow areas in one document, these subtemplates are laid out as multiple records in the flow areas, and one document is generated from records equal in number to the laid-out subtemplates. In contrast, when only one subtemplate 1203 is laid out in one document, one document is generated from one record.

A characteristic process of the embodiment will be explained.

Figure 13:
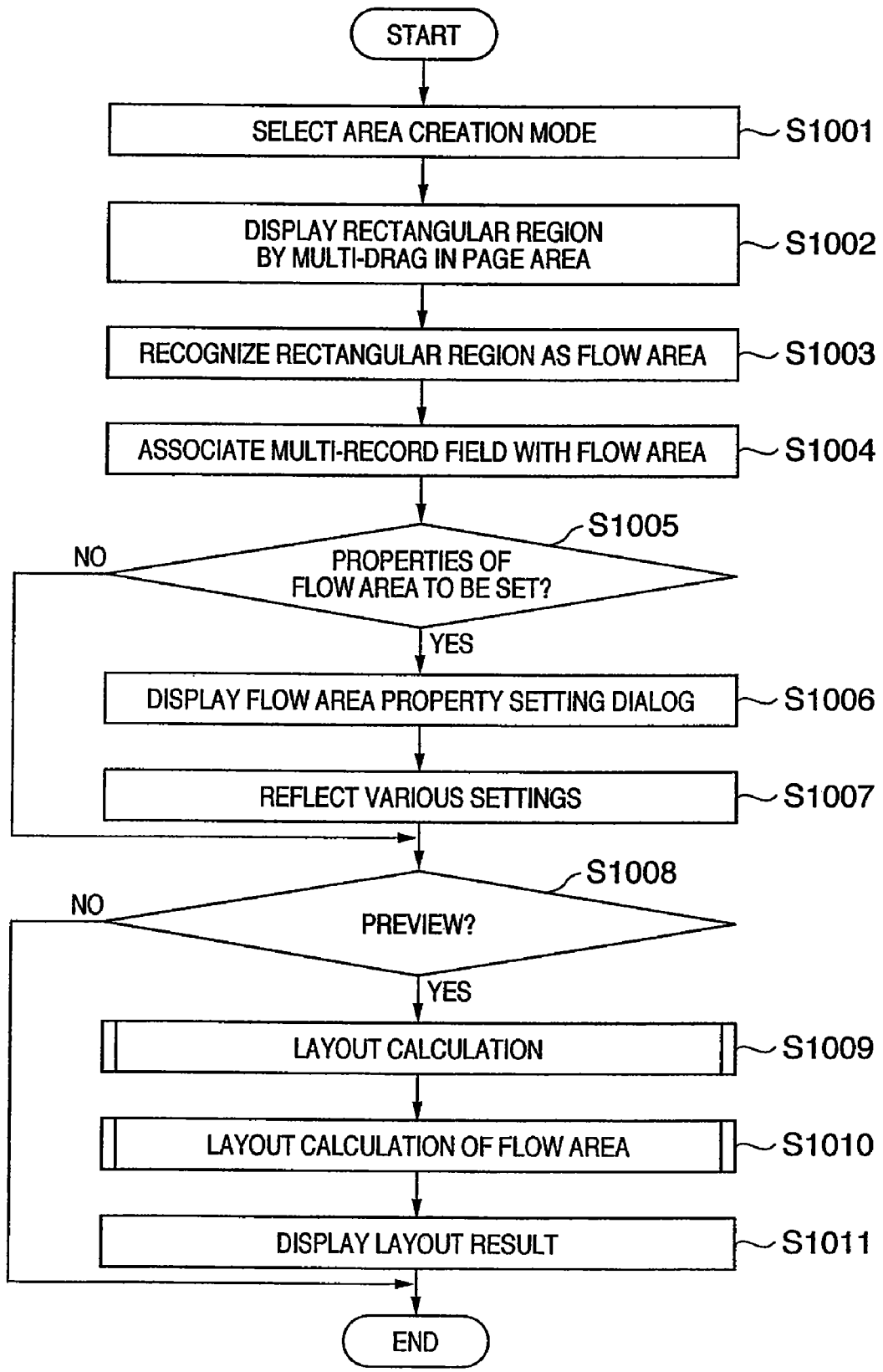
FIG. 13 is a flowchart showing a process executed by a variable printing system according to the embodiment of the present invention.

FIG. 13 is a flowchart showing a process executed by the variable printing system according to the embodiment of the present invention.

The layout editing application 121 selects an area creation mode on the basis of user operation (step S1001). Note that the area creation mode is selected by operating, e.g., an area creation tool button 1403 in an application window 1401 in FIG. 14.

The layout editing application 121 draws and displays a rectangular region in a page margin 1402 within a page area 1407 on the basis of drag operation of the mouse 133 (step S1002).

Figure 14:
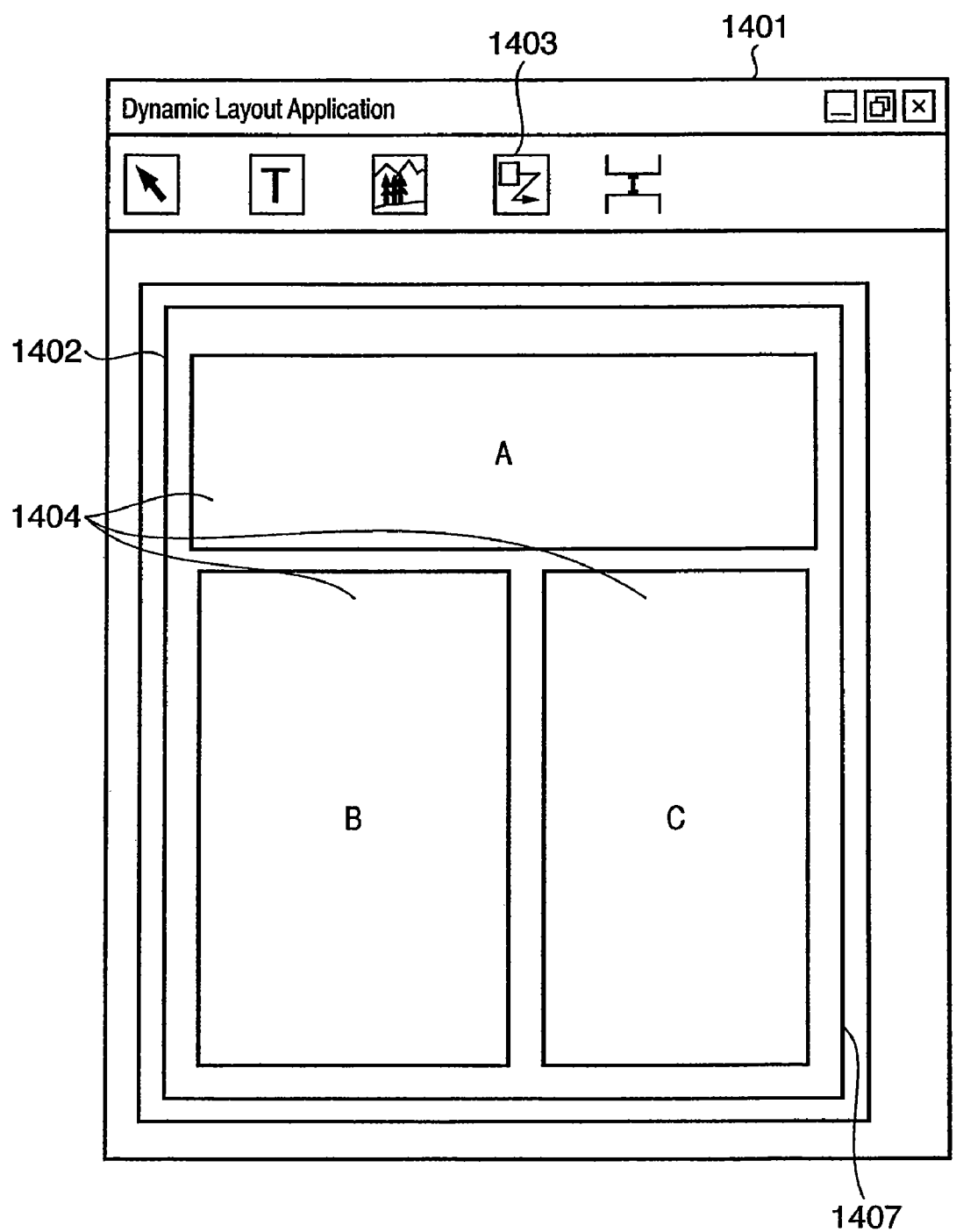
FIG. 14 is a view for explaining a concrete example of the process executed by the variable printing system according to the embodiment of the present invention.

The layout editing application 121 recognizes the drawn rectangular region as a flow area (step S1003). In FIG. 14, three flow areas 1404, i.e., flow areas A to C are displayed. In flow areas A to C, subtemplates which store different record data contained in the same record can be laid out. Association between the flow areas can be set through a flow area property setting dialog (to be described later). Note that the flow areas are different in rectangular UI such as the color or line type from their containers so that the user can visually recognize the flow areas. That is, the flow areas are displayed so that they can be discriminated from the containers.

The layout editing application 121 associates multi-record fields with the created flow areas (step S1004). Then, the layout editing application 121 determines whether to perform flow area property setting operation for the created flow area (step S1005). If no setting operation is performed (NO in step S1005), the flow advances to step S1008; if setting operation is performed (YES in step S1005), to step S1006.

Note that setting operation is implemented by, e.g., clicking a flow area subjected to setting operation with the mouse pointer.

If setting operation is performed, the layout editing application 121 displays the flow area property setting dialog (step S1006). The layout editing application 121 reflects various settings in the flow area on the basis of setting contents on the flow area property setting dialog (step S1007).

Details of the flow area property setting dialog and a setting method therefor will be described later.

The layout editing application 121 performs whether to preview the document (step S1008). If no document is previewed (NO in step S1008), the process ends; if the document is previewed (YES in step S1008), the flow advances to step S1009.

The layout editing application 121 acquires contents from the database, flows the acquired contents into the respective containers, and executes layout calculation to finalize the positions and sizes of the containers (step S1010).

The layout editing application 121 executes layout calculation of the set flow areas (step S1010). Details of this process will be described later.

The layout editing application 121 displays (previews) the layout result of layout calculation (step S1011).

The flow area property setting dialog will be explained with reference to FIG. 15.

Figure 15:
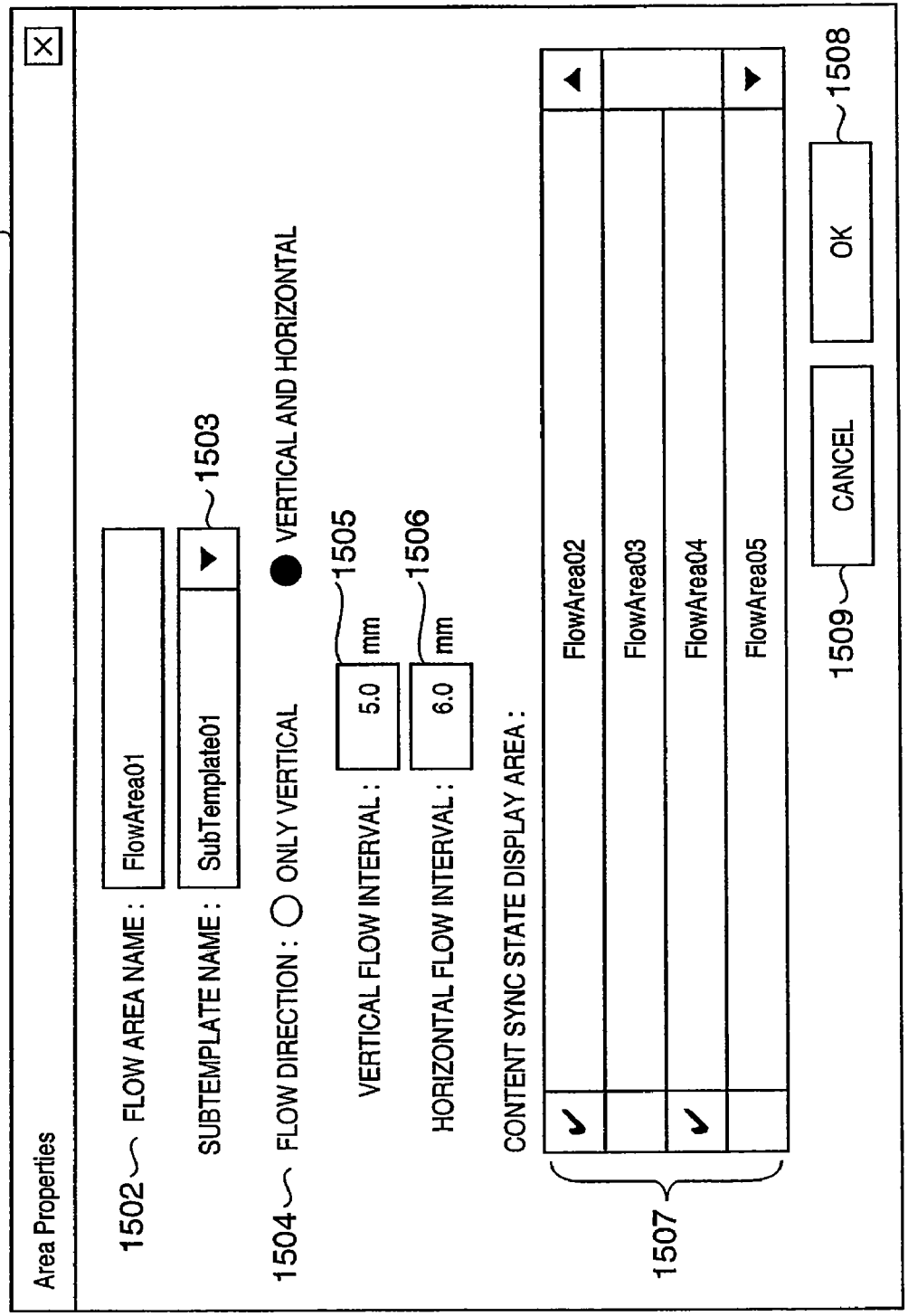
FIG. 15 is a view showing an example of a flow area property setting dialog according to the embodiment of the present invention.

FIG. 15 is a view showing an example of the flow area property setting dialog according to the embodiment of the present invention.

A flow area property setting dialog 1501 is displayed in step S1006 of the flowchart in FIG. 13. Setting contents on the flow area property setting dialog 1501 are set in step S1007 for a flow area to be processed.

In the flow area property setting dialog 1501, an arbitrary name can be input as the name of a flow area in an edit box 1502. The input name is listed and displayed in a content sync state display area 1507 which is displayed in the flow area property setting dialog for another flow area.

In a list box 1503, a subtemplate to be used for a flow area can be designated. The subtemplate can be set in a document template during editing through a unique UI, but is not limited to this. For example, a subtemplate may be saved as another file. This file is invoked and designated from the flow area property setting dialog 1501 to select and designate a desired subtemplate.

In the embodiment, a plurality of subtemplates can be created in a document template. In order to select a subtemplate from the list box, the subtemplates should be designed to have unique names so that they can be identified.

With a radio button 1504, the layout direction (flow direction) of the subtemplate can be designated. In this example, "only vertical" and "vertical and horizontal" can be selected as the layout direction (flow direction). When a plurality of subtemplates are laid out, the vertical and horizontal flow intervals can be respectively input to edit boxes 1505 and 1506 as the layout intervals between subtemplates in the flow area.

The content sync state display area 1507 represents the setting state of a content sync area. The content sync state display area 1507 lists and displays the presence/absence of sync setting with a content to be stored in a subtemplate laid out in a flow area. A flow area having sync setting is checked with a check mark "v" at its flow area name. The sync setting state can be switched between ON and OFF by user operation. The layouts of flow areas having sync setting are so decided as to have the same number of laid-out subtemplates (the same number of records).

In the example of FIG. 15, the numbers of subtemplates laid out in flow areas "FlowArea02" and "FlowArea04" are synchronized with that of subtemplates ("SubTemplate01") laid out in FlowArea10 (current flow area subjected to property setting).

As sync operation, for example, subtemplates can be laid out for three records in FlowArea01, four records in FlowArea02, and four records in FlowArea04. Subtemplates are laid out in accordance with a flow area corresponding to the smallest number of layout enable subtemplates.

In this case, subtemplates can be laid out for four records in FlowArea02 and FlowArea04, but only three records in FlowArea01. Hence, when sync operation is performed, subtemplates for three records are laid out in each flow area, and no subsequent subtemplate is laid out.

To finalize settings on the flow area property setting dialog 1501, an OK button 1508 is operated. To cancel settings, a cancel button 1509 is operated.

[Subtemplate]

The subtemplate and a layout process therefor will be explained.

Similar to a document template, the subtemplate lays out arbitrary numbers of image containers and text containers, and sets which data (field) of a record is assigned to each container. The subtemplate means a template which is saved as part (component) of the document template.

The subtemplate is given a unique name in the document template in order to discriminate the subtemplate from another. With this configuration, subtemplates can be discriminated from each other when many identical layouts are used in one document.

Containers laid out in the subtemplate are image and text containers, as described above, and links can be set between the containers. The whole subtemplate and the layout size of a building component can be optimally changed depending on data (data to be laid out) to be inserted into a container.

A layout process in the subtemplate will be explained with reference to FIG. 16.

Figure 16:
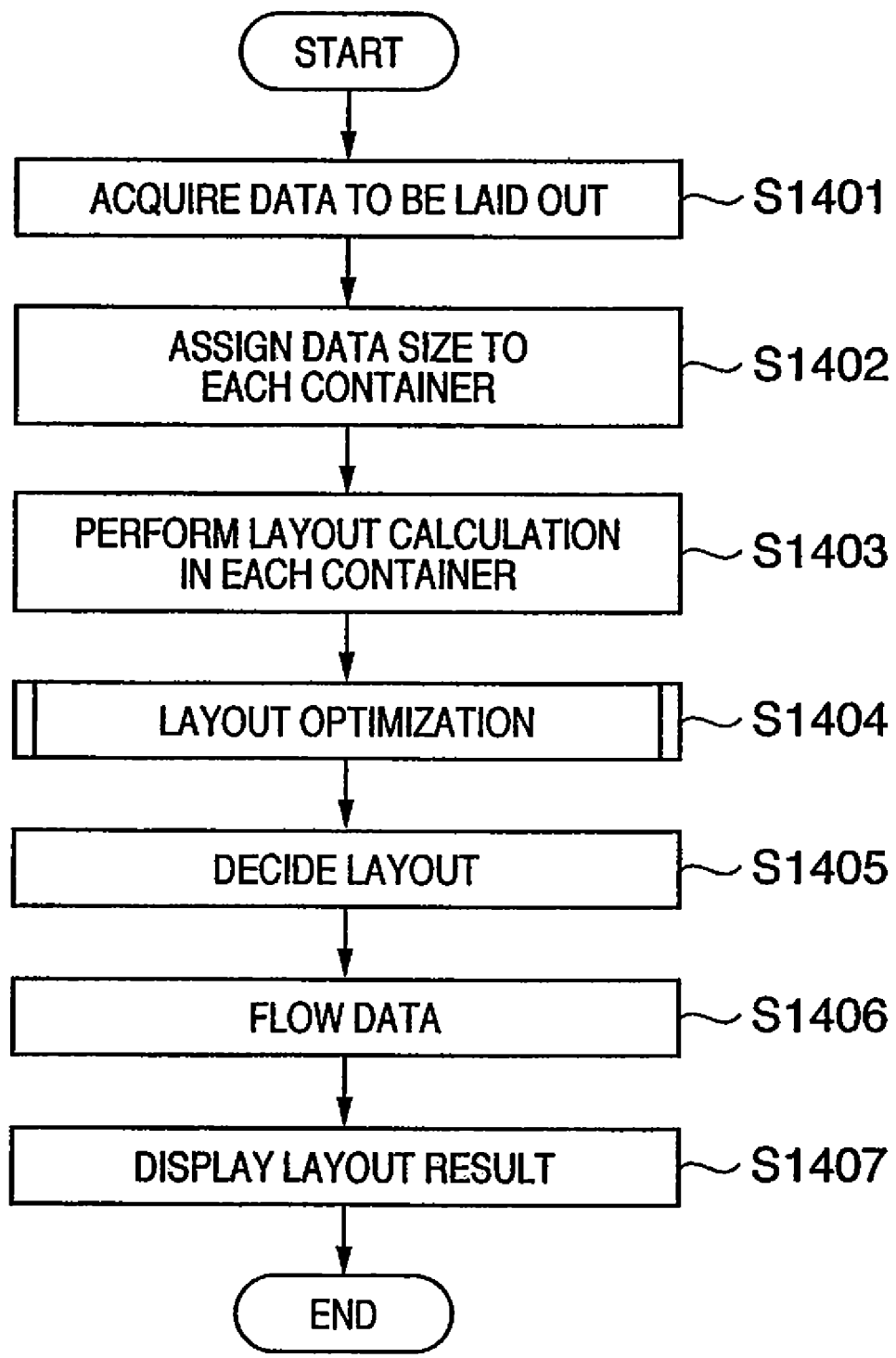
FIG. 16 is a flowchart showing a layout process in a subtemplate according to the embodiment of the present invention.

FIG. 16 is a flowchart showing the layout process in the subtemplate according to the embodiment of the present invention.

The layout editing application 121 acquires data (content in the database) to be laid out (step S1401). The layout editing application 121 assigns the size of the data to each container (step S1402). The layout editing application 121 executes layout calculation to lay out the data in the container on the basis of the assigned data size (step S1403).

The layout editing application optimizes the layout (step S1404). This process is the same as step S903 in FIG. 9. The layout editing application 121 decides the optimized layout (step S1405). The layout editing application 121 flows the data into a corresponding container (step S1406). Then, the layout editing application 121 displays the layout result (step S1407).

An example of the layout of the subtemplate will be explained with reference to FIG. 17.

Figure 17:
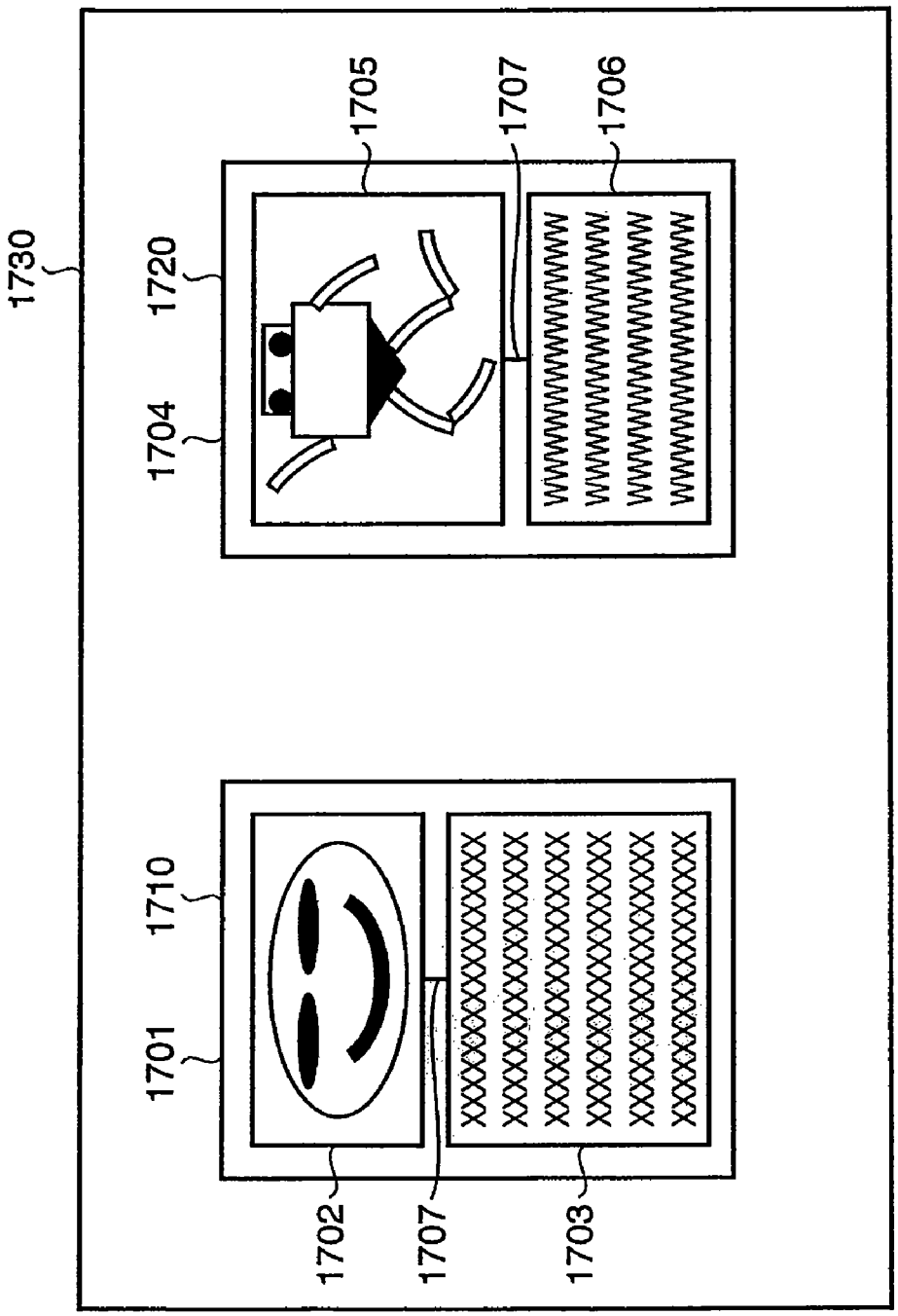
FIG. 17 is a view showing an example of the layout of the subtemplate according to the embodiment of the present invention.

FIG. 17 is a view showing an example of the layout of the subtemplate according to the embodiment of the present invention.

In FIG. 17, flow areas 1710 and 1720 created from the same subtemplate are laid out in a document 1730. In the flow areas 1710 and 1720, reference numerals 1702 and 1705 denote image containers; 1703 and 1706, text containers; and 1707, a link.

Contents (images and texts) flowed into the image and text containers are different records and have different sizes. By the process in FIG. 16, optimal layouts of the containers in the flow areas 1710 and 1720 are calculated on the basis of the sizes of the flowed contents, and the containers are laid out.

[Flow Area Layout Calculation Process]

Figure 18:
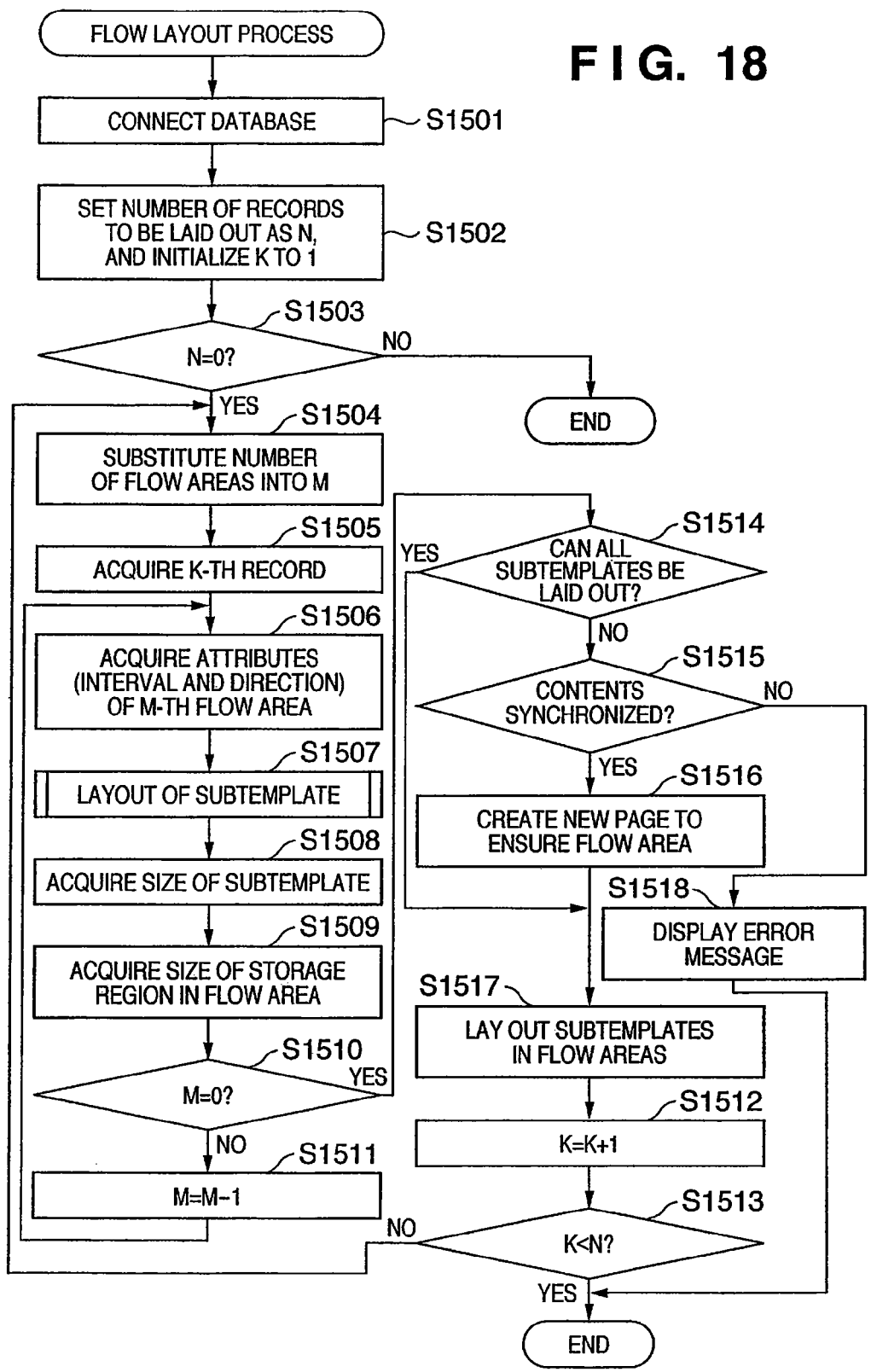
FIG. 18 is a flowchart showing a flow area layout calculation process according to the embodiment of the present invention.

FIG. 18 is a flowchart showing a flow area layout calculation process according to the embodiment of the present invention.

The process in FIG. 18 is implemented by control of the layout editing application 121.

A database associated with a document template is connected (step S1501). This connection method can be implemented using an existing technique, and a description of details thereof will be omitted.

The number of records (number of records to be laid out) is acquired from the acquired data, and set as a variable N. In addition, a repeat variable K is initialized to 1 (step S1502).

Whether N=0, i.e., whether the acquired number of records is 0 is determined (step S1503). If N=0 (YES in step S1503), i.e., no record exists, the process ends. If N≠0 (NO in step S1503), the number of flow areas defined in the document template is substituted into a variable M (step S1504). This process is executed for each record.

The Kth record is acquired from the connected database (step S1505). Then, various setting attributes (flow direction, flow interval, and the like) of the Mth flow area that are set in the flow area property setting dialog (FIG. 15) are acquired (step S1506).

The layout of a subtemplate is calculated by the above-described process in FIG. 16 using data of each data field stored in the record and a subtemplate set in the flow area (step S1507). The size of the circumscribed rectangle of the subtemplate having the calculated layout is acquired (step S1508). The size of a storage region which can be laid out in the current flow area is calculated (step S1509).

Whether the variable M=0, i.e., a flow area to be processed exists is determined. If the variable M=0 (NO in step S1510), i.e., another flow area is set, the variable M representing the number of flow areas is decremented, and the flow returns to step S1506 (step S1511).

The process from step S1506 to step S1509 is repeated by the number (M) of flow areas to calculate the sizes of storage regions which can be laid out in respective flow areas, and the sizes of the circumscribed rectangles of subtemplates to be laid out.

If it is determined in step S1510 that the sizes of storage regions and those of the circumscribed rectangles of subtemplates have been calculated for all flow areas, i.e., the variable M=0 (YES in step S1510), the flow advances to step S1514.

Whether all subtemplates can be laid out in the respective flow areas is determined in consideration of set flow directions and flow intervals (step S1514). If all subtemplates can be laid out (YES in step S1514), the respective subtemplates are laid out in corresponding flow areas (step S1517).

If even one subtemplate cannot be laid out (NO in step S1514), it is determined whether sync setting of contents has been made (step S1515). If no sync setting of contents has been made (NO in step S1515), the contents cannot be synchronized, thus an error message (not shown) is displayed, and the process ends (step S1518).

If sync setting of contents has been made (YES in step S1515), a new page is created to ensure a new flow area (step S1516). After that, the respective subtemplates are laid out at predetermined positions in the flow areas (step S1517). Note that the predetermined position is calculated from the flow direction and flow interval.

By the above process, the subtemplates are laid out at optimal positions in the flow areas.

In order to execute the same process for a subsequent record, the repeat variable K is incremented to prepare for acquisition of the next record (step S1512). The repeat variable K is compared with the number N of records to determine whether K<N (step S1513), i.e., whether an unprocessed record exists. If K≧N (NO in step S1513), the flow returns to step S1504 to reset the variable M. Then, the same process is executed for the next record.

As a result of the above process, the contents of subtemplates laid out on a page are synchronized. Even in a document in which one record is divided and laid out, a more effective record layout can be implemented without scattering information.

[Flow Area Layout]

An example of the layout of a subtemplate in a flow area by the process in FIG. 18 will be described with reference to FIG. 19.

Figure 19:
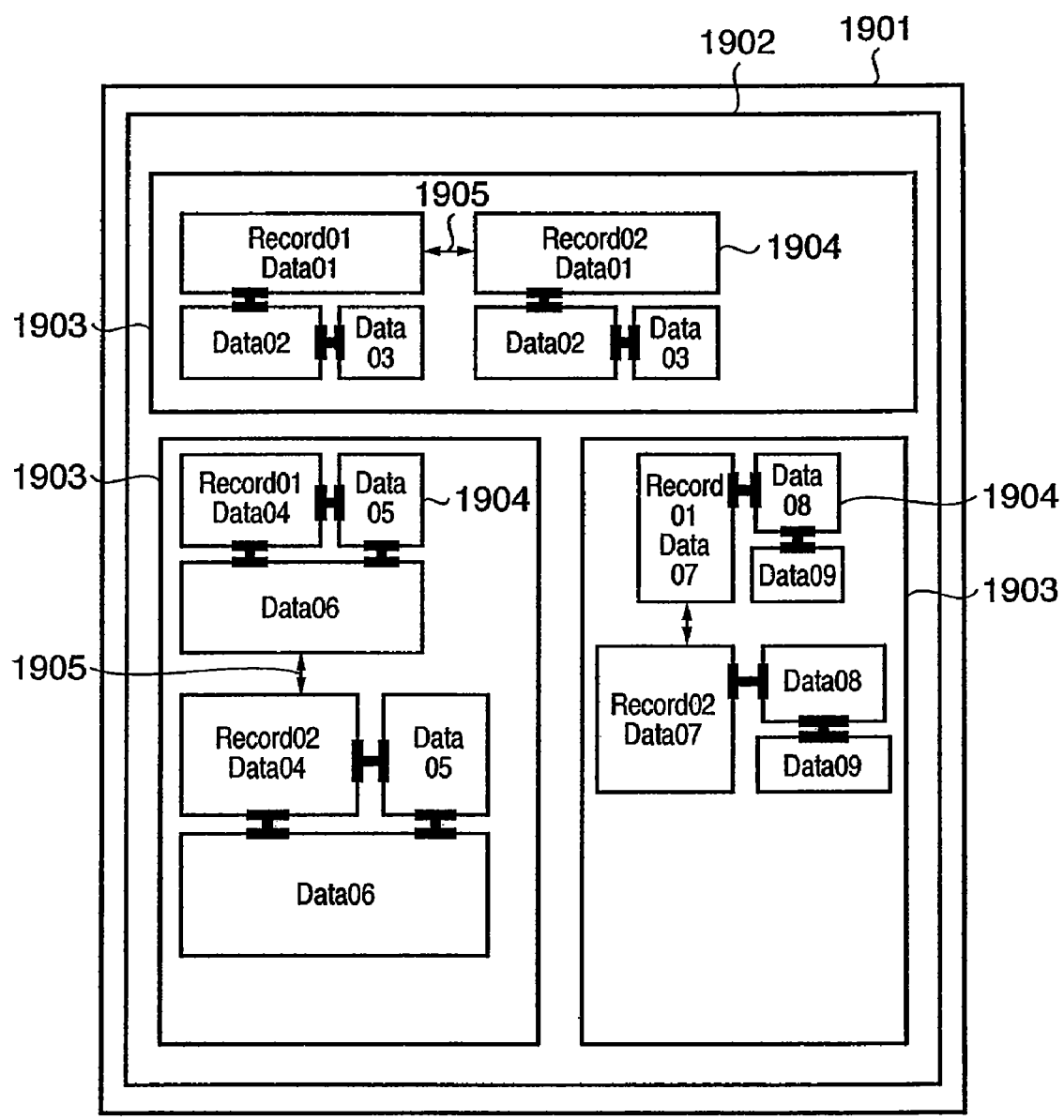
FIG. 19 is a view showing an example of the layout of a subtemplate in a flow area according to the embodiment of the present invention.

FIG. 19 is a view showing an example of the layout of a subtemplate in a flow area according to the embodiment of the present invention.

In FIG. 19, reference numeral 1901 denotes a page boundary; 1902, a page margin; 1903, a flow area; 1904, a subtemplate; and 1905, horizontal and vertical flow intervals.

In FIG. 19, subtemplates are laid out in three flow areas 1903. In each flow area, subtemplates are laid out using the upper left corner of the flow area as a starting point at proper flow intervals set on the flow area property setting dialog.

Each subtemplate has a different size in accordance with the data size. Data01 to Data09 contained in Record01 are divided into three subtemplates, and laid out.

In FIG. 19, data of two records Record01 and Record02 are fitted in one page. Depending on the data size, data of three records or data of only one record may be fitted in the flow area. If the number of records laid out on one page changes, confused information may be provided as a document. When the data size changes, it is important to synchronize the numbers of subtemplates which can be laid out in respective flow areas.

In FIG. 19, the flow areas 1903 are synchronized to adjust the numbers of laid-out subtemplates to two. In other words, when sync setting is made between flow areas, the numbers of subtemplates used in the respective flow areas are restricted to the smallest maximum number of subtemplates among the maximum numbers of subtemplates available in the respective flow areas.

As described above, according to the embodiment, different subtemplates are selected in accordance with the contents (values) of one record data extracted from the database, and records are flowed into the selected subtemplates. This flow process is repeated for records to define a plurality of partial layout areas (flow areas) in which various subtemplates and records are connected. Various partial layouts are processed separately in a plurality of partial layout areas. Accordingly, a layout for repeating complicated layout switching, which cannot be implemented by a conventional flow process, can be achieved.

This layout is very effective when creating a document in which partial layouts, which have an indefinite number of items and are similar to a certain degree but different in detailed layout structure, are grouped to allow the user to intuitively compare products.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-036952 filed on Feb. 14, 2005, which is hereby incorporated by reference herein its entirety.

What is claimed is:

1. An information processing apparatus performing layout processing to arrange one or more sub-templates in which contents data is inserted, comprising:
   a creation unit configured to create a first flow area and a second flow area on a page, wherein the sub-templates are not arranged in the first flow area and the second flow area as created by said creation unit;
   a setting unit configured to set sync information to decide layout such that a number of the sub-templates arranged in the first flow area is equal to a number of the sub-templates arranged in the second flow area;
   an insertion unit configured to insert contents data into the sub-templates;
   a deciding unit configured to decide a number of the sub-templates which can be arranged in the second flow area as the number of the sub-templates for the first flow area and the second flow area, when the number of the sub-templates in which the contents data is inserted, which can be arranged in the first flow area, is more than the number of the sub-templates in which the contents data is inserted, which can be arranged in the second flow area;
   and
   an arranging control unit configured to arrange the sub-template(s) in which the contents data is inserted in both the first and the second flow areas in accordance with the number of sub-templates decided by said deciding unit,
   wherein said apparatus further comprises at least one processor and a memory, and wherein said processor and said memory serve as each of said units.

2. The apparatus according to claim 1, further comprising a page generation unit configured to generate a new page to arrange the sub-template(s), when the sync information is set and it is decided by said deciding unit that the sub-template(s) cannot be arranged in both the first flow area and the second flow area.

3. The apparatus according to claim 1, further comprising a layout setting unit configured to set a layout direction and a layout interval of the sub-template(s) to arrange the sub-template(s) in the first flow area and the second flow area.

4. An information processing method for performing layout processing to arrange one or more sub-templates in which contents data is inserted, comprising the steps of:
   creating a first flow area and a second flow area on a page, wherein the sub-templates are not arranged in the first flow area and the second flow area as created in said creation step;
   setting sync information to decide layout such that a number of the sub-templates arranged in the first flow area is equal to a number of the sub-templates arranged in the second flow area;
   inserting contents data into the sub-templates;
   deciding a number of the sub-templates which can be arranged in the second flow area as the number of the sub-templates for the first flow area and the second flow area, when the number of the sub-templates in which the contents data is inserted, which can be arranged in the first flow area, is more than the number of the sub-templates in which the contents data is inserted, which can be arranged in the second flow area;
   and
   arranging the sub-template(s) in which the contents data is inserted in both the first and the second flow areas in accordance with the number of sub-templates decided in said deciding step
   wherein at least some of said steps are performed by a computer.

5. The method according to claim 4, further comprising the step of generating a new page to arrange the sub-template(s), when the sync information is set and it is decided in said deciding step that the sub-template(s) cannot be arranged in both the first flow area and the second flow area.

6. The method according to claim 4, further comprising the step of setting a layout direction and a layout interval of the sub-template(s) to arrange the sub-template(s) in the first flow area and the second flow area.

7. A computer-readable storage medium, storing, in executable form, a program for causing a computer to perform an information processing method for performing layout processing to arrange one or more sub-templates in which contents data is inserted, the method comprising the steps of:
   creating a first flow area and a second flow area on a page, wherein the sub-templates are not arranged in the first flow area and the second flow area as created in said creation step;
   setting sync information to decide layout such that a number of the sub-templates arranged in the first flow area is equal to a number of the sub-templates arranged in the second flow area;
   inserting contents data into the sub-templates;
   deciding a number of the sub-templates which can be arranged in the second flow area as the number of the sub-templates for the first flow area and the second flow area, when the number of the sub-templates in which the contents data is inserted, which can be arranged in the first flow area, is more than the number of the sub-templates in which the contents data is inserted, which can be arranged in the second flow area; and
   arranging the sub-template(s) in which the contents data is inserted in both the first and the second flow areas in accordance with the number of sub-templates decided in said deciding step.

8. A computer-readable storage medium according to claim 7, wherein the method further comprises the step of generating a new page to arrange the sub-template(s), when the sync information is set and it is decided in said deciding step that the sub-template(s) cannot be arranged in both the first flow area and the second flow area.

9. A computer-readable storage medium according to claim 7, wherein the method further comprises the step of setting a layout direction and a layout interval of the sub-template(s) to arrange the sub-template(s) in the first flow area and the second flow area.

* * * * *